(12) United States Patent
Yoda et al.

(10) Patent No.: US 6,256,692 B1
(45) Date of Patent: Jul. 3, 2001

(54) CARDBUS INTERFACE CIRCUIT, AND A CARDBUS PC HAVING THE SAME

(75) Inventors: Hideaki Yoda; Shigemitsu Suganuma, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/031,349

(22) Filed: Feb. 27, 1998

(30) Foreign Application Priority Data

Oct. 13, 1997 (JP) .................................... 9-279168

(51) Int. Cl.⁷ .................................... G06F 13/00

(52) U.S. Cl. .................... 710/104; 710/100; 710/101; 710/102; 710/103; 710/126; 710/129

(58) Field of Search .................... 710/100, 101, 710/102, 103, 104, 126, 127, 128, 129, 10, 11, 14, 16; 703/25; 711/170, 171, 172, 173

(56) References Cited

U.S. PATENT DOCUMENTS

| | | | |
|---|---|---|---|
| 5,423,697 | * 6/1995 | MacGregor | 439/638 |
| 5,586,268 | * 12/1996 | Chen et al. | 710/38 |
| 5,774,680 | * 6/1998 | Wanner et al. | 710/110 |
| 5,812,827 | * 9/1998 | McGrath | 395/500 |
| 5,832,238 | * 11/1998 | Helms | 710/105 |
| 5,847,543 | * 12/1998 | Carroll | 320/125 |

* cited by examiner

Primary Examiner—Rupal Dharia
(74) Attorney, Agent, or Firm—Arent Fox Kintner Plotkin & Kahn, PLLC

(57) ABSTRACT

The present invention is a CardBus PC Card corresponding to a CardBus and having a CardBus connector, characterised in that it has a device corresponding to a PCI bus, having a specified function and having a first configuration space which corresponds to a PCI bus, and an interface circuit located between the device corresponding to a PCI bus and the CardBus connector, and having a second configuration space which corresponds to the CardBus, the first and second configuration spaces comprising a configuration space which corresponds to a CardBus. The above-mentioned present invention makes it possible to configure a PC Card complying with a CardBus and having the configuration space which is required for a CardBus.

14 Claims, 18 Drawing Sheets

FIG.3

CONFIGURATION SPACE MAP

| ADDRESS | 31 . . . . . . . . . . . . . . . . 16 | 16 . . . . . . . . . . . . . . . . 00 | | |
|---|---|---|---|---|
| 00h | DEVICE ID*1 | | VENDOR ID*1 | |
| 04h | STATUS | | COMMAND | |
| 08h | CLASS CODE*1 | | | REVISION ID*1 |
| 0Ch | BIST | HEADER TYPE | LATENCY TIMER | CACHE LINE SIZE |
| 10h | BASE ADDRESS REGISTER | | | |
| 14h | BASE ADDRESS REGISTER | | | |
| 18h | BASE ADDRESS REGISTER | | | |
| 1Ch | BASE ADDRESS REGISTER | | | |
| 20h | BASE ADDRESS REGISTER | | | |
| 24h | BASE ADDRESS REGISTER | | | |
| 28h | CIS POINTER | | | |
| 2Ch | SUB SYSTEM ID*1 | | SUB SYSTEM VENDOR ID*1 | |
| 30h | (EXPANSION ROM BASE ADDRESS) | | | |
| 34h | RESERVED | | | Cap_Ptr |
| 38h | RESERVED | | | |
| 3Ch | Max_Lat*1 | Min_Gnt*1 | INTERRUPT PIN | INTERRUPT LINE*1 |
| 40h ⋮ FCh | TUPLE SPACE/ BACK END DEVICE LOCAL REGISTER | | | |

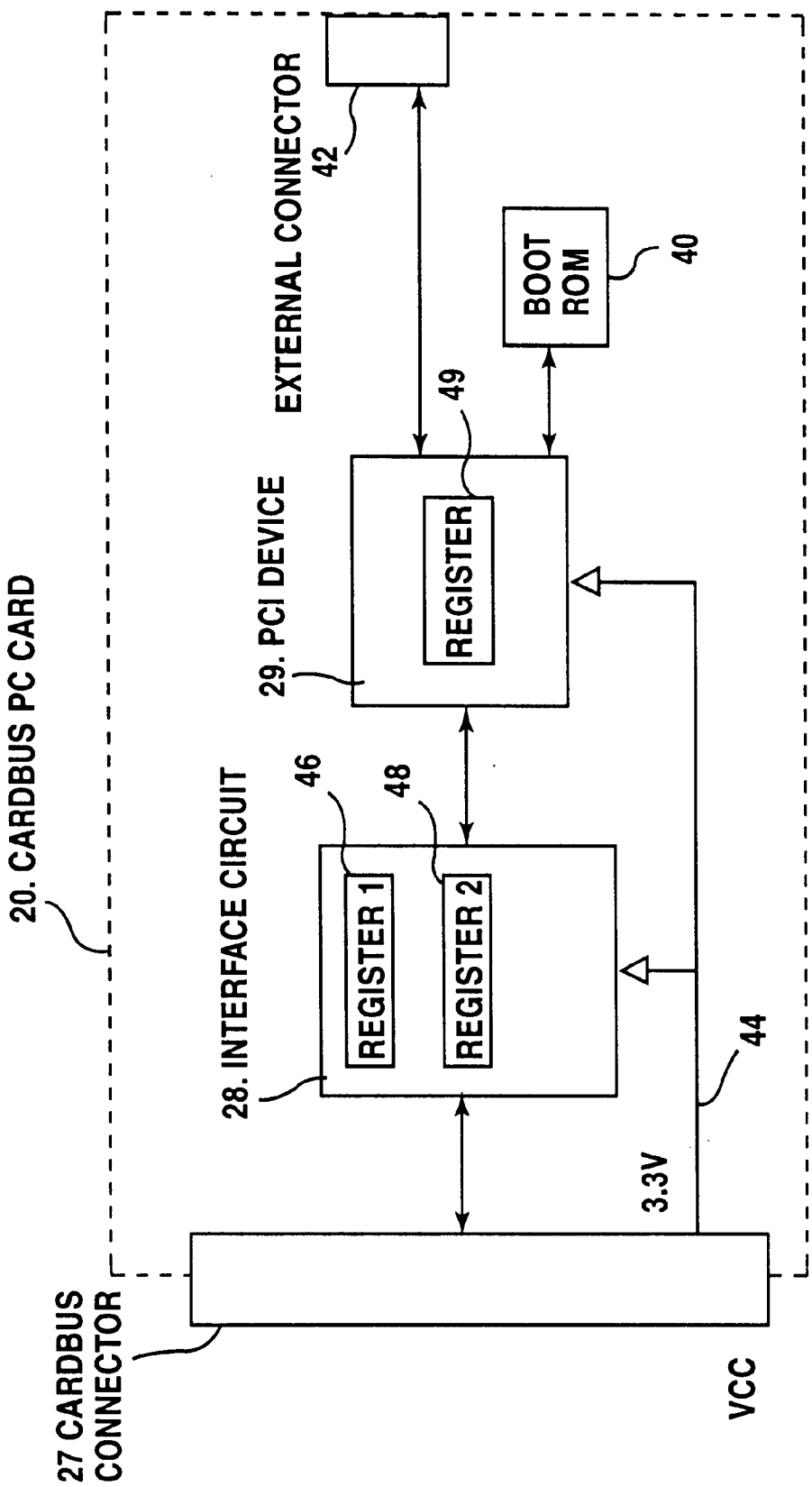

TIMING CHART FOR DATA TRANSFER (WRITING)

FIG. 14  TIMING CHART OF BURST READ TRANSFER (1 CLOCK DELAY)

FIG. 15 TIMING CHART OF SINGLE READ TRANSFER

TIMING CHART OF BURST READ TRANSFER

TIMING CHART OF BURST READ TRANSFER USING PHASE-SYNCHRONIZED CLOCK

TIMING CHART OF BURST TRANSFER IN CONFIGULATION SPACE

CARDBUS INTERFACE CIRCUIT, AND A CARDBUS PC HAVING THE SAME

BACKGROUND TO THE INVENTION

1. Field of the Invention

The present invention relates to a PC Card applied to a CardBus which is used under PCI bus architecture. It relates in particular to an interface circuit for use where a device complying with a PCI bus connects to a CardBus, and to a PC Card having this which is capable of being connected to a CardBus.

2. Description of the Related Art

PCI (Peripheral Component Interconnect) buses are high-speed buses standardized as local buses for use in personal computers, and offering operational stability and extendability together with abundant bus and system control functions. PCI buses are 32-bit wide buses synchronised with a 33 MHz clock, and are capable of achieving transfer speeds up to a maximum of 133 Mbyte/sec. To these PCI buses, PCI cards with SCSI controllers, graphic accelerators and other PCI devices can be connected directly via a PCI connector.

Meanwhile, there are also CardBuses, which have been standardized with a view achieving the same functions as a PCI bus by means of a PC Card. 16-bit PC Cards have been available for fitting to 16-bit ISA buses, and CardBuses has been standardized so as to enable PC Card with business card size to be fitted to PCI buses. Thus, PC Cards for use in CardBuses, i.e. 32-bit PC Cards, are connected to the PCI bus via a PCI-CardBus bridge within the CardBus below the bridge.

PC Cards for use in CardBuses, ie 32-bit PC Cards (hereinafter for the sake of simplicity referred to as 'CardBus PC Cards'), offer the same facilities for SCSI controllers, graphic accelerators and other devices as the PCI devices. The only difference is that CardBus PC Cards are configured as cards of business-card size rather than for fitting on to a printed substrate as with PCI devices.

However, the above-mentioned CardBuses differ from PCI buses in two respects. Firstly, while the power supply for CardBuses is restricted to 3.3 V, PCI buses are compatible with both 3.3 V and 5 V. Secondly, CardBuses make use of card attribute data known as CIS (Card Information Structure) in order to assign their resources. This CIS constitutes the PC Card attribute data which needs to be communicated to the system side when the CardBus PC Card is inserted. Thus, in the case of a CardBus PC Card complying with a CardBus, a CIS pointer register showing the memory area where the CIS is stored is provided within the configuration space thereof. It may be added that in the example to which the present aspect pertains, as will be explained later, the configuration space is a memory area having a plurality of configuration registers.

Meanwhile, in case of a PCI device connected to a PCI card via a PCI connector, configuration space is provided in the same manner and a CIS pointer register as above is prescribed as an option register, but hardly any PCI devices have one packaged.

As has been mentioned above, an SCSI controller, graphic accelerator and other facilities are packaged with a PC Card as PCI devices (LSIs with PCI interface), which can be connected to the PCI bus via a PCI connector. Further, the above SCSI controller, etc. are integrated within the PC Card as an LSI and connected to the CardBus via a CardBus connector. Thus, while the function is the same, one complies with a PCI bus while the other complies with a CardBus. The above two points constitute the principal differences, but a PCI device complying with a PCI bus can not be used by being mounted on PC Card without modification.

It is an object of the present invention to provide an interface circuit which allows a PCI device to be used as an LSI mounted within a CardBus PC Card.

It is a further object of the present invention to provide a PC Card with an interface circuit of this type.

SUMMARY OF THE INVENTION

With a view to achieving the above-mentioned object, the present invention is a CardBus PC Card complying with a CardBus and having a CardBus connector, comprising:

a device complying with a PCI bus, having a predetermined function and having a first configuration space which complies with the PCI bus; and an interface circuit located between said device complying with the PCI bus and said CardBus connector, and having a second configuration space which complies with said CardBus, wherein said first and second configuration spaces constitute a configuration space which complies with a CardBus.

The above-mentioned present invention makes it possible to constitute a PC Card complying with a CardBus and having the configuration space which is required for a CardBus.

With a view to achieving the above-mentioned object, the present invention is further a CardBus PC Card as described above, characterized in that the interface circuit monitors the status of the CardBus which is connectable to the CardBus connector, and when the second configuration space is accessed, halts the transfer of signals from the CardBus to the device complying with the PCI bus, and sends back data from the second configuration space, while on the other hand transferring signals at the CardBus to the device complying with the PCI bus when anywhere other than the second configuration space is accessed.

In this configuration the interface circuit allows a general-purpose inexpensive PCI device to be used as a device for a CardBus PC Card.

With a view to achieving the above-mentioned object, the present invention is a CardBus PC Card complying with a CardBus and having a CardBus connector, comprising:

a device complying with a PCI bus, having a predetermined function and having a first configuration space which complies with the PCI bus; and an interface circuit located between said device complying with the PCI bus and said CardBus connector, and having a second configuration space which complies with said CardBus, said first and second configuration spaces constituting a configuration space which complies with said CardBus, said interface circuit having a control circuit which monitors the state of said CardBus and when detecting that somewhere other than said second configuration space has been accessed in accordance with a signal from said CardBus received with a first clock timing, transfers the signal from said CardBus to said device complying with the PCI bus with a second clock timing having a delay of at least one clock in comparison with said first clock timing, while on the other hand when detecting that said second configuration space has been accessed, instead of transferring the signal from said CardBus to said device complying with the PCI bus, outputs data from said second configuration space to said CardBus.

The above configuration ensures that there is ample time for the interface circuit to decode the commands and addresses which are fed to the CardBus connector, and to determine whether or not the integrated configuration space is being accessed. Thus the transferring of CardBus signals to the PCI device can reliably be prevented when the integrated register is being accessed.

With a view to achieving the above-mentioned object, the present invention is a CardBus PC Card complying with a CardBus and having a CardBus connector, comprising:

a device complying with a PCI bus, having a predetermined function and having a first configuration space which complies with a PCI bus; and an interface circuit located between said device complying with the PCI bus and said CardBus connector, and having a second configuration space which complies with said CardBus, said first and second configuration spaces constituting a configuration space which complies with said CardBus, said interface circuit having a control circuit which monitors the state of said CardBus and when it detecting that somewhere other than said second configuration space has been accessed in accordance with a signal from said CardBus transmitted with a first clock timing, transfers the signal from said CardBus to said device complying with the PCI bus with a second clock timing having a delay of at least one clock in comparison with said first clock timing, while on the other hand when detecting that said second configuration space has been accessed, instead of transferring the signal from said CardBus to said device complying with the PCI bus, outputs data from said second configuration space to said CardBus.

This configuration allows access to the integrated configuration space to be detected by decoding a signal transmitted by the initiator with a first clock timing prior to receiving with the following second clock timing, thus making it possible to transfer CardBus signals to the PCI device with the second clock timing. It thus becomes possible not only to detect whether or not the integrated configuration space has been accessed, but to prevent delay in transferring normal signals.

BRIEF DESCRIPTION OF THE DRAWINGS

FIG. 3 illustrates the configuration of the configuration space in CardBus specifications.

FIG. 4 illustrates the configuration of the CardBus PC Card of the present embodiment.

DESCRIPTION OF THE PREFERRED EMBODIMENTS

There follow detailed descriptions of embodiments of the present invention in accordance with the attached drawings, but these embodiments should not in any way be construed as restricting the technical scope of the present invention.

Figure 1:
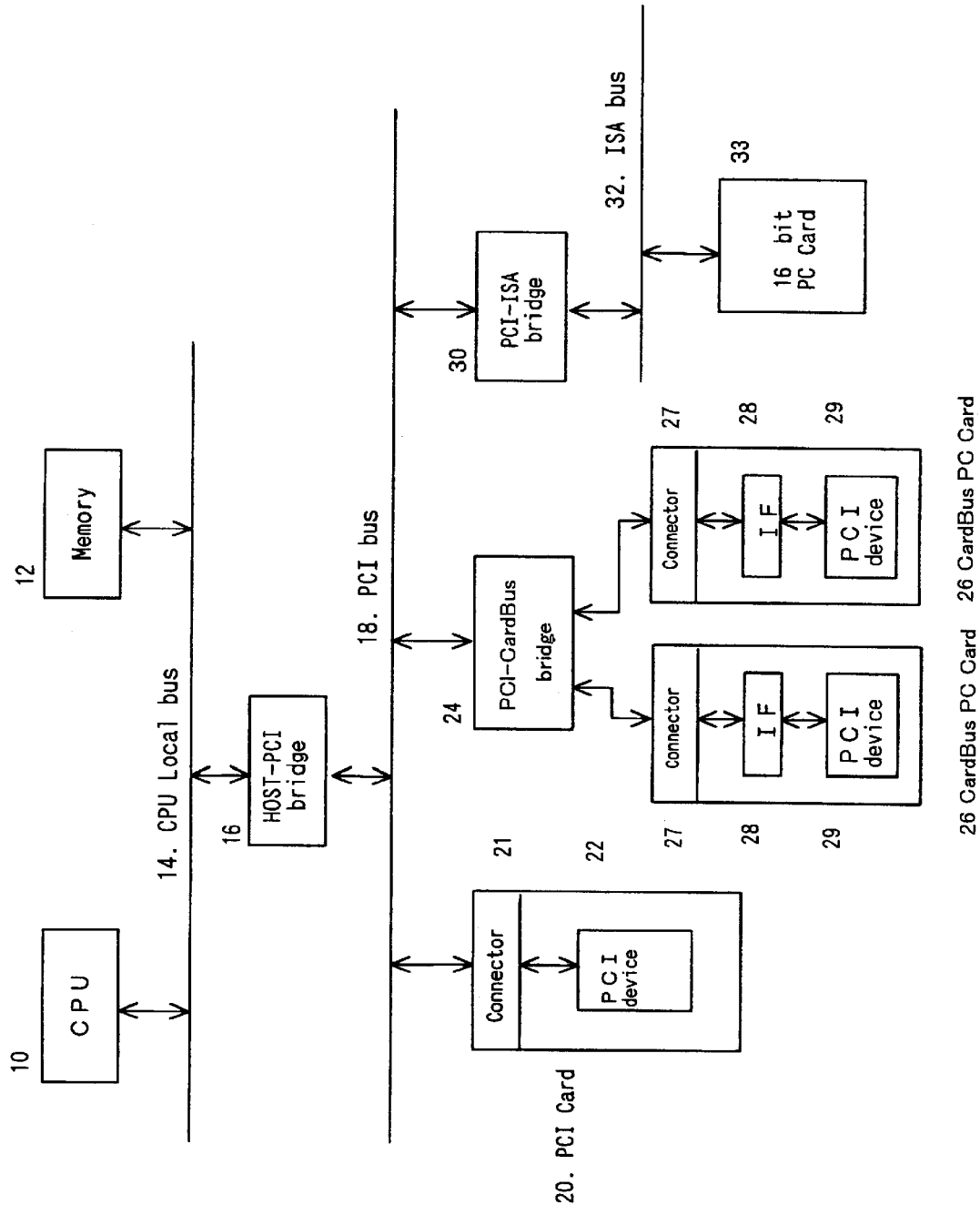
FIG. 1 illustrates an example of the configuration of a PCI bus.

FIG. 1 illustrates an example of the configuration of a PCI bus. A central processing unit (CPU) 10 and memory 11 are connected to a CPU local bus 14, and this CPU local bus 14 is in turn connected via a host-PCI bridge 16 to a PCI bus 18. To this PCI bus 18 connects via a PCI connector 21 a PCI card 20 on which is mounted a PCI device such as a SCSI or graphic accelerator applied to the PCI bus. This means that the PCI device 22 has an interface function configuration space adapted for control of the PCI bus. The PCI card 20 is normally the form of a printed substrate, which connects to the PCI bus 18 by means of a connector.

The PCI bus 18 is further connected via a PCI-CardBus bridge 24 to a PC Card 26 which complies with a CardBus. This means that below the PCI-CardBus bridge 24 is the area of the CardBus. Moreover, the PCI bus 18 can also be connected via a PCI-ISA bridge 30 to an ISA bus 32, and to this ISA bus 32 can be attached a corresponding PC Card 33.

As FIG. 1 shows, the CardBus PC Card 26 according to the present embodiment has an integrated connector 27 corresponding to a CardBus, an interface circuit 28 and a PCI device 29. This is the same as the LSI which is normally mounted on the PCI card 20. In the present embodiment, the interface circuit 28 has at least one configuration space which is not normally provided in the above-mentioned PCI device and which includes a CIS pointing register peculiar to CardBus specifications. The interface circuit 28 functions in such a manner as to transmit back to the system the contents of the CIS pointing register in the configuration space when this is accessed, but simply to transfer the bus signals to subsequent PCI devices when anywhere else is accessed. The provision of this interface circuit allows PCI devices normally mounted on PCI cards to be mounted on the CardBus PC Card without modification.

Figure 2:
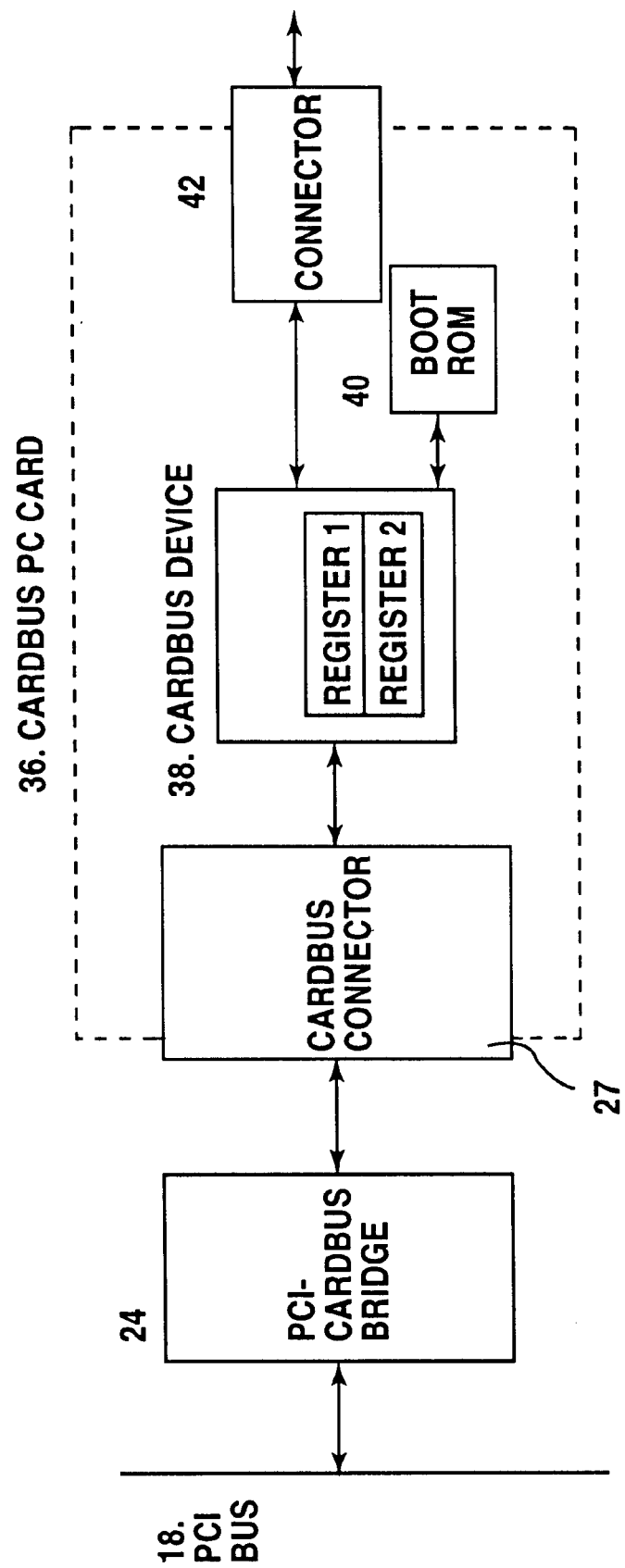
FIG. 2 illustrates in outline the configuration of a CardBus PC Card on which is mounted a CardBus device

FIG. 2 illustrates in outline the configuration of a CardBus PC Card on which is mounted a CardBus device. The CardBus PC Card 36 has an integrated device 38 which is applied to the CardBus. It also has a boot ROM 40 in which are stored programs for booting. The CardBus PC Card 36 is connected via the CardBus connector 27 to the PCI-CardBus bridge 24, and by means of a connector 42 to the peripheral devices. If the CardBus device 38 is an SCSI, for instance, a hard disk and optical disk device are connected to the connector 42, while in the case of a LAN card, they are connected to the LAN network wiring.

FIG. 3 illustrates the configuration of the configuration space in CardBus specifications. In both the PCI bus and the CardBus the address space has configuration space, memory space and I/O space. A plurality of configuration registers is allocated to this configuration space, and in these configuration registers is stored attribute data such as the ID of the device and of the vendor who supplies it. In order that the system is able to acquire the attribute data of the device which is connected to the bus by the so-called plug-and-play method, the configuration space is allocated to a dedicated address space, and the above-mentioned attribute data is read in the configuration cycle.

As will be seen from the configuration space map in FIG. 3, the identity code of the vendor supplying the PCI device is stored in the vendor ID register (Vendor ID) of the address 00h, while the model code of the device is stored in the device ID register (Device ID). Similarly, the type of device is stored in the class code register (Class Code), and the version code in the version register (Revision ID). This attribute data of the PCI device is also stored into the configuration space of the PCI device to which is directly connected to the PCI bus. By identifying this data for the device, it is possible for the system to supply the necessary driver by means of a simple operation.

In the address 28h of the configuration space map shown in FIG. 3 is located a CIS pointing register (CIS Pointer). In this CIS pointer register are stored the addresses where attribute data for the CardBus PC Card is stored in the area beyond the address 40h. The CIS (Card Information Structure) is attribute data which contains such as information on the PC Card model name, I/O address, interruption and memory space, and which is vital in point of CardBus specifications determined by expanding the PCI bus. In the address 2ch are stored the sub-system vendor ID register with the identity code of the vendor supplying the PC Card, the sub-system ID register with information on the PC Card, and data on power management. The capability pointer register (Cap Ptr), where the memory address is stored, is also a register inside the configuration space which is necessary to a CardBus PC Card. Thus, hardly any of these registers are located in the configuration space of the PCI device, and in particular there is hardly any CIS pointer register. Consequently, when the PCI device is mounted into a CardBus PC Card, an area for these registers must be secured in some form or other.

FIG. 4 illustrates the configuration of the CardBus PC Card of the present embodiment. In this example, a general-use PCI device 29 is mounted within the PC Card, and an interface circuit 28 is inserted between a 68-pin CardBus connector 27 and the PCI device 29. The PCI device 29 has within it a configuration space 49 corresponding to a PCI bus. In this example the PCI device 29 is compatible with a 3.3 V power source, which is the same as the power source for the CardBus PC Card. Consequently, the power can be fed directly from the power source pin of the connector 27 by means of a power supply wire 44. In order to comply with CardBus specifications, registers 46, 48 are provided within the configuration space although they are not present in the PCI bus specifications. Thus, the configuration space which corresponds to the CardBus comprises the configuration space 49 within the device 29 corresponding to the PCI bus, and the configuration spaces 46, 48 within the interface circuit.

The above-mentioned CIS data is stored within a boot ROM 40, and the address is stored in the configuration space 46 within the interface circuit 28. In the other register 48 are stored the above-mentioned sub-system ID, capability pointer and other attribute data for use with the CardBus PC Card. An external connector 42 is connected to peripheral devices or network devices according to the type of the PCI device 29 as already explained. In the present example the CardBus PCI card can be configured simply by adding the interface circuit 28 and storing the CIS data in the boot ROM 40.

As has been explained above, the interface circuit 28 illustrated in FIG. 4 contains at least the CIS pointer register and other configuration registers which are required only by the CardBus specifications. For instance, the CIS pointer is stored in the register 46, and the sub-system ID and other data in the register 48. For other configuration registers, a PCI configuration space 49 within the PCI device 29 is used. Thus, the interface circuit 28 switches according to the address accessed in the configuration cycle between responding with the contents of its own registers 46, 48, and allowing the PCI device to respond with the contents of the registers within its configuration space 49. This means that there is a need for a monitoring circuit within the interface circuit 28 to detect whether or not the internal registers are accessed in the configuration cycle. In the normal transfer cycle the interface circuit simply transfers bus signals between the system and subsequent PCI devices.

All that is stored in the internal register 46 within the interface circuit 28 is the address where the CIS is stored. The CIS data as such can be stored in the boot ROM 40, allowing the scale of the internal register circuit to be simplified. Moreover, the internal register is accessed only when the PC Card 20 is inserted into the bridge circuit socket, and is rarely accessed during normal operation.

Inserting the interface circuit 28 causes a delay in the signals on the bus, and the status of the bus to subsequent PCI devices needs to be adjusted when the register within the interface circuit 28 has been accessed. It is therefore necessary to provide a timing adjustment circuit and a bus adjustment circuit within the interface circuit 28. The timing adjustment circuit also adjusts the transfer timing of bus signals in view of the delay which occurs when the monitoring circuit determines whether or not the internal register in the interface circuit has been accessed.

In this manner, in the present embodiment the minimum required registers are provided within the interface circuit 28, and the interface circuit 28 monitors the status of the bus and switches between the internal register and the PCI device 29. In other words, except when an internal register within the interface circuit is accessed, the bus signals are transferred straight to the PCI device 29 or the system. When an integrated register is accessed, the bus cycle of the PCI device 29 is terminated normally by the interface circuit, and the data in the integrated registers 46, 48 is output together with the parity.

Figure 5:
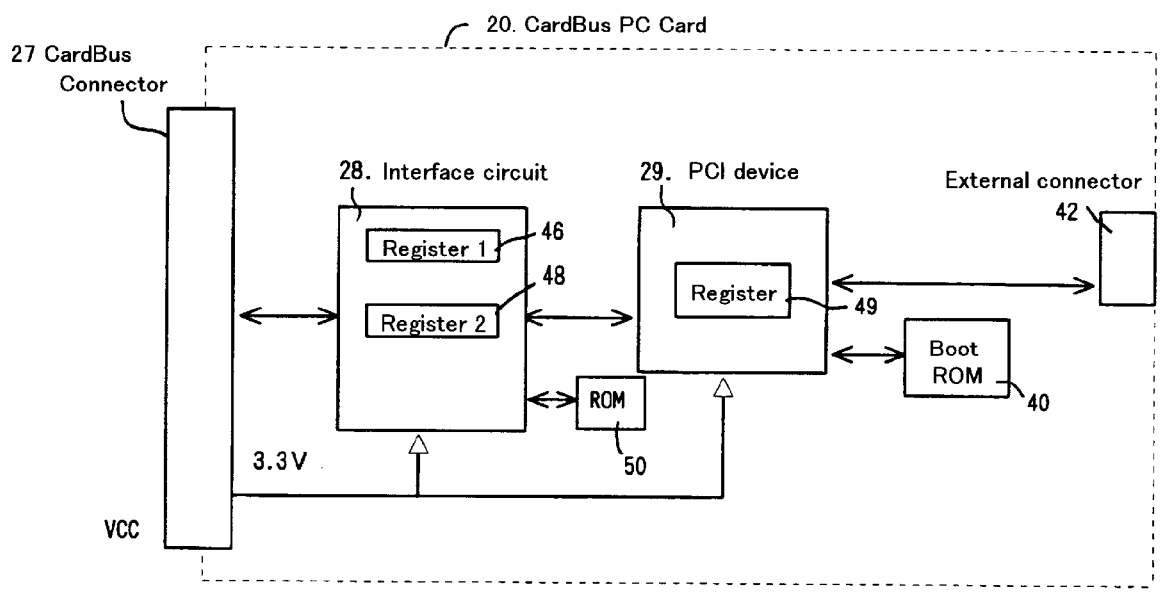
FIG. 5 illustrates another embodiment of the CardBus PC Card.

FIG. 5 illustrates another embodiment of the CardBus PC Card. In this example, the contents of the internal registers 46, 48 of the interface circuit 28 are capable of being modified. For this reason, an external ROM 50 is added, together with a function whereby the interface circuit 28 can read a content of the external ROM 50 and write it into the internal registers. In other words, the external ROM 50 serves to initialise the internal registers 46, 48. For instance, when the PC Card 20 is inserted into the socket and power is supplied, the data in the ROM 50 is read by the interface circuit and written into the internal registers 46, 48. In this manner, it is possible to feed card vendor and other data of the register within the abovementioned CardBus specifications configuration space in the internal registers 46, 48 from the external ROM 50. This means that where a PC Card with mounted interface circuit 28 and PCI device 29 is supplied by an OEM, the card vendor can set his data in the external ROM 50. In such cases a serial or similar ROM which permits the simple setting of data is used as the external ROM 50.

Figure 6:
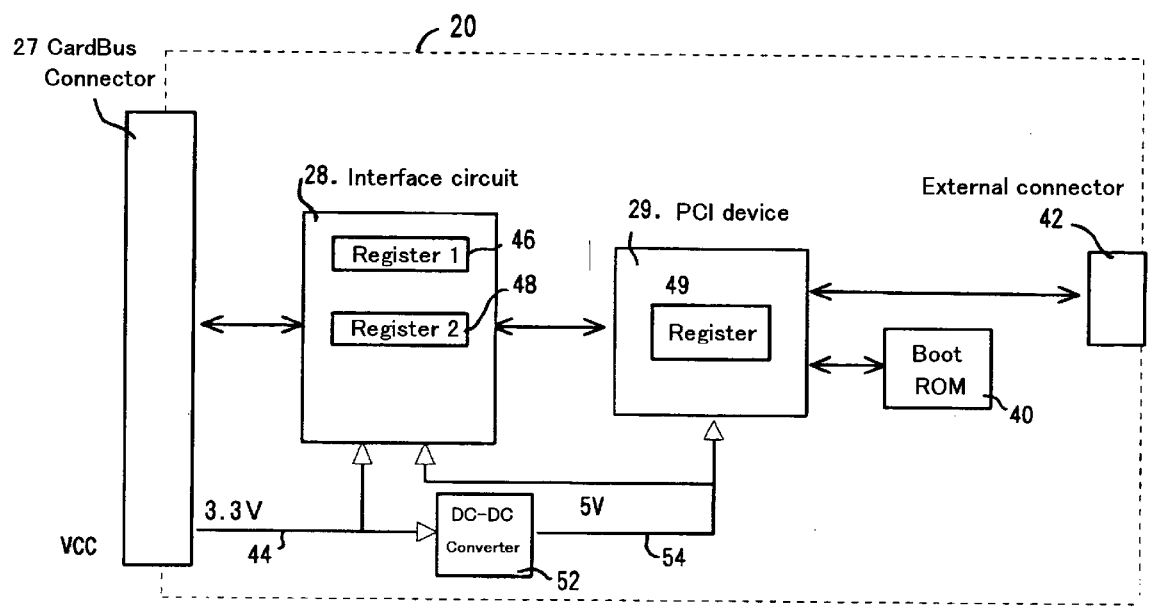
FIG. 6 illustrates the configuration of a CardBus PCI card of yet another embodiment.

FIG. 6 illustrate s the configuration of a CardBus PCI card of yet another embodiment. The CardBus Pwm card 20 illustrated in FIG. 6 has mounted on it a PCI device 29 which is compatible with a 5 V power source. Thus, a DC-DC converter 52 which is capable of boosting the 3.3 V of the PC connector to 5 V is located between the power supply wires 44 and 54 for the purpose of supplying the power. All the other parts are the same as in FIG. 4.

Figure 7:
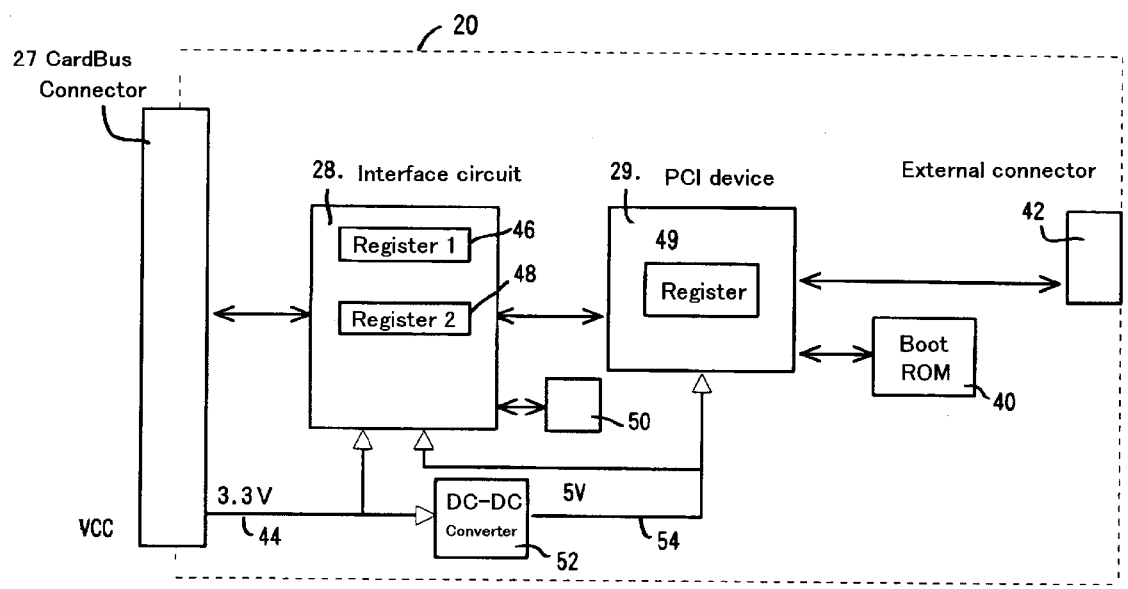
FIG. 7 illustrates the configuration of a CardBus PCI card of yet another embodiment.

FIG. 7 illustrates the configuration of a CardBus PCI card of yet another embodiment. The CardBus PCI card 20 illustrated in FIG. 7 also has a PCI device 29 mounted on it which is compatible with a 5 V power source. Thus, a DC-DC converter 52 which is capable of boosting the 3.3 V of the PC connector to 5 V is located between the power supply wires 44 and 54 for the purpose of supplying the power. All the other parts are the same as in FIG. 5, and it has a ROM 50 for use in initialisation.

Figure 8:
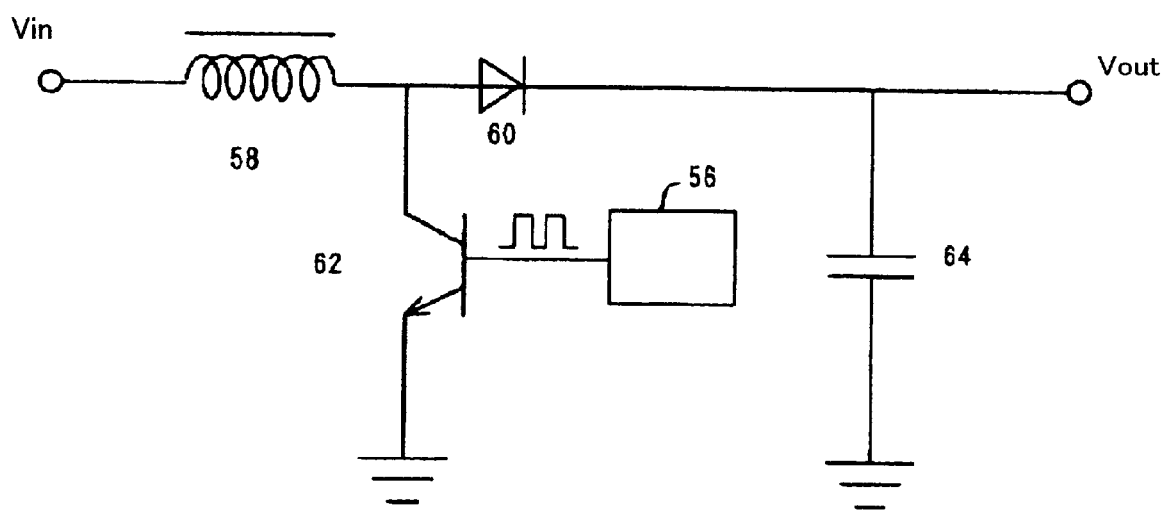
FIG. 8 illustrates the detailed configuration of the DC-DC converter.

FIG. 8 illustrates the detailed configuration of the DC-DC converter 52 shown in FIGS. 6 and 7. This converter 52 has a transistor 62 with a pulse generation circuit 56 connected to its base, an inductance 58, a diode 60 and a capacity 64. When the pulse signal of the pulse generation device 56 is at H level, the transistor 62 switches on, and current is accepted from an input Vin, 3.3 V power source. Energy accumulated at this time in the inductance 58 is supplied via the diode 60 to the capacity 64 when the pulse signal is at L level. As a result, power source voltage boosted from 3.3 V to 5 V is generated in the capacity 64.

Figure 9:
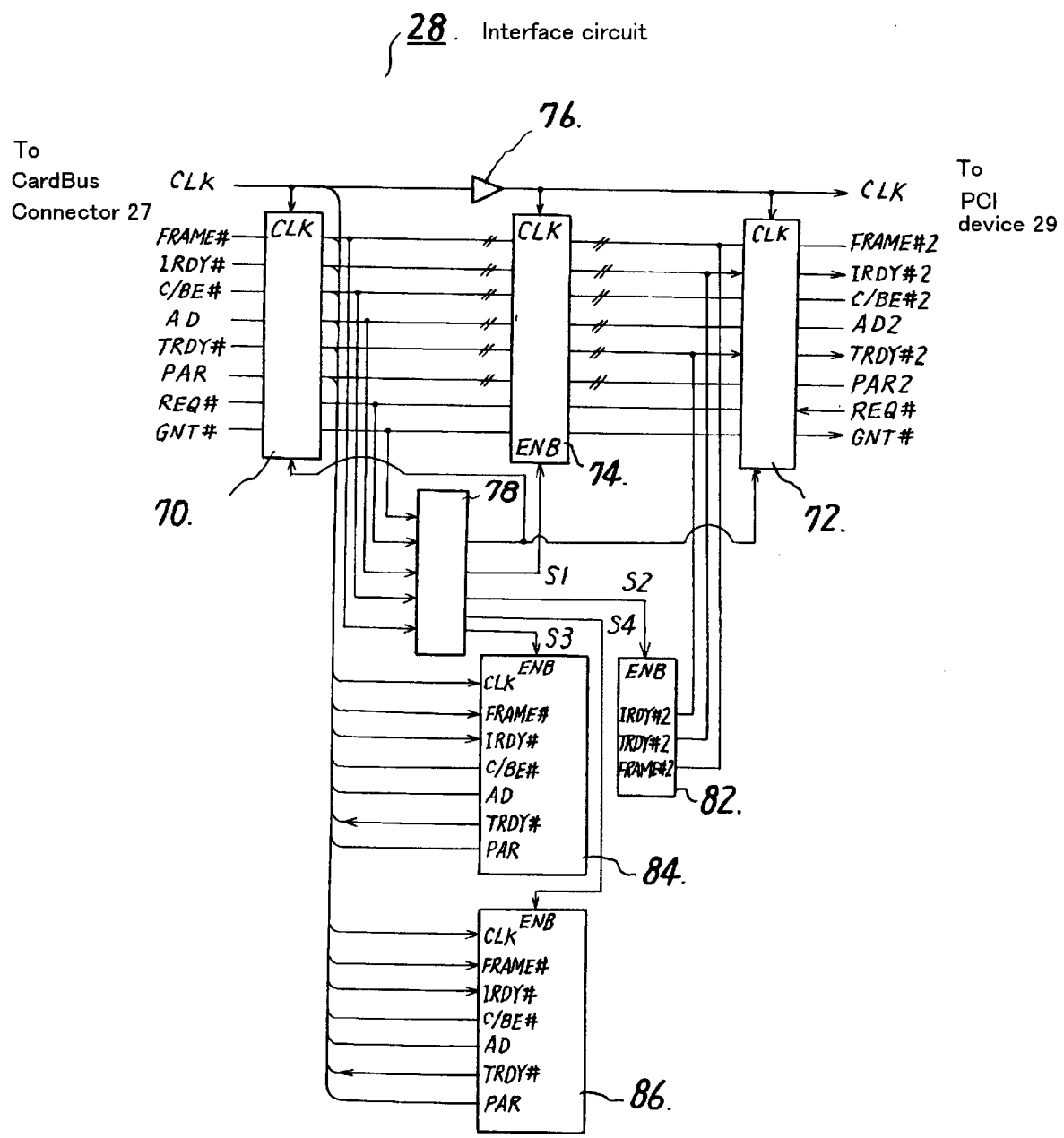
FIG. 9 illustrates the detailed configuration of the interface circuit.

FIG. 9 illustrates the detailed configuration of the interface circuit 28. This drawing shows some of the signal lines of the PCI bus. As will be seen from the drawing, cycle frame FRAME#, initiator ready IRDY#, bus command & byte enable C/BE#, address & data AD, target ready TRDY#, parity PAR, request REQ# and grant GNT# are each connected to an input/output buffer 70 on the CardBus connector side and an input/output buffer 72 on the PCI device side. Between the two input/output buffers 70, 72 is located a bidirectional tri-state buffer 74 for the purpose of controlling the transfer timing of these bus signals. A clock CLK supplied from the system is delayed, for instance, by a half-clock with the aid of a clock buffer 76, and transferred to the PCI device. The input/output buffers 70, 72 take bus signals in with the rising timing of the clock CLK. Bus signals other than signals shown in the drawing have simply been omitted, and are in actual fact connected to the input/output buffers 70, 72 and the tri-state buffer 74. The tri-state buffer 74 operates as a bidirectional buffer circuit except when an internal register is being accessed.

A decoder 78 with bus-monitoring function monitors the respective statuses of the CardBus and PCI device buses. To be more precise, cycle frame FRAME#, command & byte enable C/BE# and address & data AD are fed to the decoder 78 together with request REQ# and grant GNT#. The decoder determines master or slave on the basis of request REQ# and grant GNT#, and detects the initiation of the bus cycle, whether or not it is a configuration cycle, what address is being accessed, and other information. Thus, the decoder 78 feeds enable signals S1–S4 to the corresponding circuits in accordance with the status it has detected.

An enable signal S2 from the decoder 78 activates a PCI device processing circuit 82. This is the above-mentioned PCI device bus adjustment circuit, and adjusts the status of the PCI device bus as required when the internal register is accessed. internal registers 84, 86 accessed at this time, are activated by the corresponding enable signals S3, S4 and send the stored data and the corresponding parities back to the system. The tri-state buffer 74 normally transfers bus signals without modification, but transferring is forbidden by means of the enable signal S1 from the decoder 78 when the internal registers 84, 86 are accessed.

Figure 10:
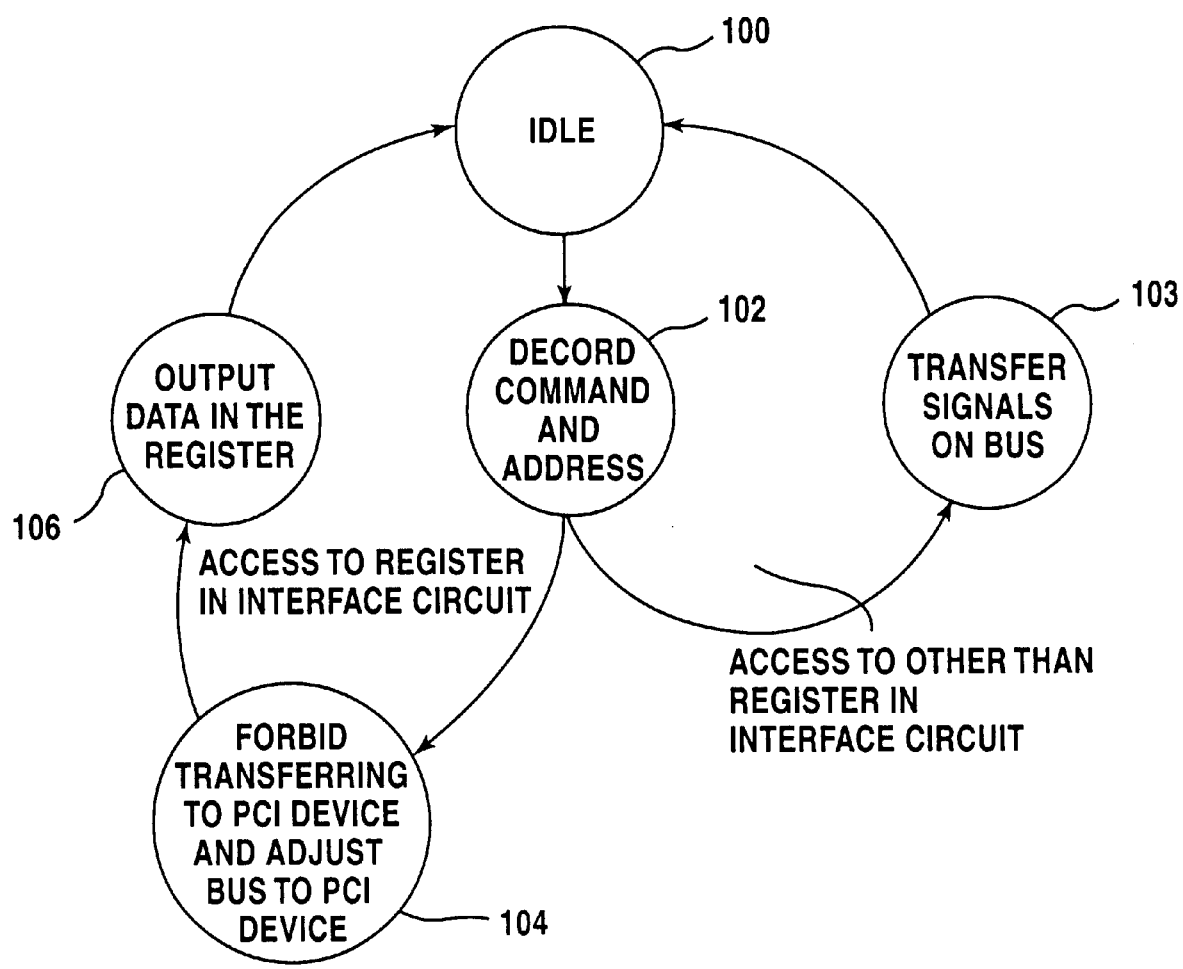
FIG. 10 illustrates the changes of status in the interface circuit.

FIG. 10 illustrates the changes of status in the interface circuit. The decoder 78, which has a bus-monitoring function, decodes command at the bus command & byte enable C/BE# and address at the address & data AD when cycle frame FRAME# is asserted (L level) from the idle status 100 of the bus, and detects whether or not the internal configuration space of the interface circuit has been accessed (Status 102). If access was to somewhere other than a register within the interface circuit, it simply maintains the transfer of signals on the bus (Status 103). moreover, if the decoder detects access to the internal registers of the interface circuit, it forbids transferring by the tri-state buffer 74, terminates the PCI device bus and makes other adjustments (Status 104), and sends the data within the internal registers back from the address bus AD (Status 106). Target ready TRDY#, parity PAR and other necessary signals are processed.

Figure 11:
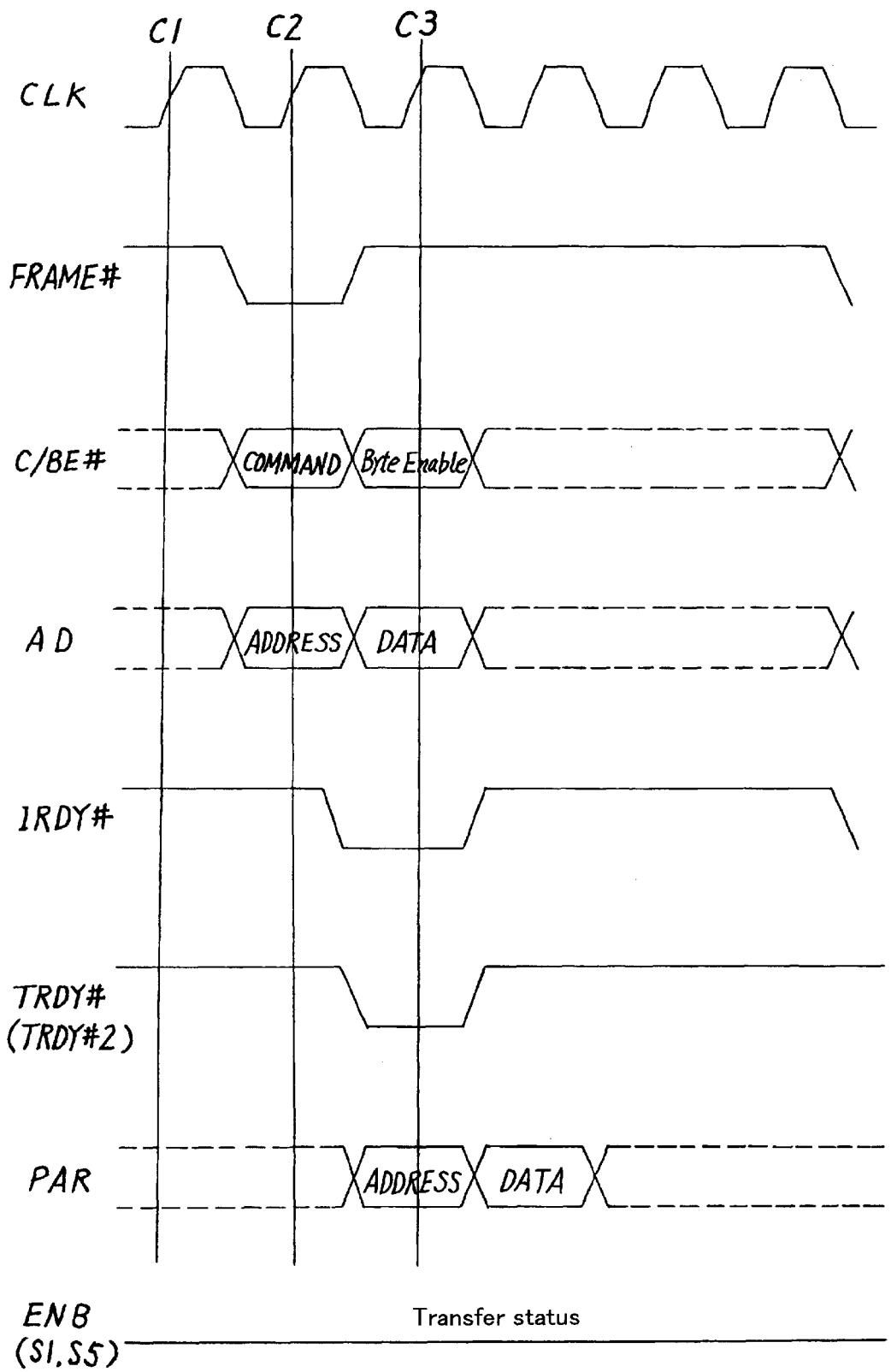
FIG. 11 is a timing chart for data transfer (writing) of single data phase.

FIG. 11 is a timing chart for data transfer (writing) of single data phase. The explanation which follows takes as an example the writing of data from the system into the memory space of the PCI device. The system, which is the initiator, samples cycle frame FRAME# and initiator ready IRDY# with clock C1 timing, and detects that the bus is in idle status from the fact that both these signals are in dessert status. The system as the initiator then asserts cycle frame FRAME# (L level)with clock C1 timing, and notifies initiation of a bus cycle. In the same way, the system as the initiator sends the address of the memory space where to be written at the address data AD, and the write command at command & byte enable C/BE#, both with clock C1 timing.

These bus signals are received into the input buffer 70 of the target side with clock C2 timing. Cycle frame FRAME#, address & data AD address and command & byte enable C/BE# command are decoded by the decoder 78. The decoder 78 deciphers these signals and detects that the internal configuration area has not been accessed, and the status of transfer of the tri-state buffer 74 is maintained. As a result, the bus signals which were received with clock 2 timing are transferred from the input/output buffer 72 to the PCI device with timing which is delayed in comparison with clock 2 timing with the aid of a clock buffer 76. It is transferred, for instance, with a delay of a half-clock.

The PCI device 29 also deciphers cycle frame FRAME#, address & data AD address and command & byte enable C/BE# command in the same way, detects that it has been accessed, asserts device select DEVSEL# (not shown in the drawings) as the target with clock C3 timing, and declares that it will respond.

The system initiator sends to address data AD the data which is to be written, and to command & byte enable C/BE# the effective byte data for the data which is to be written, both with clock C2 timing. With the same clock 2 timing, the system initiator asserts initiator ready IRDY# (L level), at the same time deserting cycle frame FRAME# and notifying that the data phase is the final one. The PCI device 29, which is the target, asserts target ready TRDY#2 with clock C3 timing, and notifies that it is in a status wherein it is capable of receiving data. The assertion of target ready TRDY#2 output from the PCI device 29 is received with clock C4 timing by the interface circuit 28, and transferred as target ready TRDY# to the initiator with timing which is delayed in comparison with clock 4 timing. Thus, the initiator retains the data and data enable signal at least until clock C5 timing, and continues asserting initiator ready IRDY#.

The PCI device 29, which is the target, receives the bus signals with clock C5 timing, retrieves valid data from the address data AD in accordance with the valid byte data of command & byte enable C/BE#, and writes it into the prescribed area.

Finally, the PCI device 29 at the target desserts target ready TRDY#2 and device select DEVSEL#. The initiator detects this and desserts initiator ready IRDY#, completing the bus cycle.

When the PCI device 29 is the initiator, the opposite procedure to the above is implemented between the PCI device 29 and the system. In this case, the decoder 78 detects from the status of the PCI device bus that a bus cycle has been initiated. The status of activation of the enable signal Si of the bidirectional tri-state buffer 74 is maintained, and subsequent bus signals are transferred.

In this manner the decoder 78 determines whether or not the command at the command & byte enable C/BE# from the system is a configuration cycle, and whether or not the address at the address data AD is associated to an internal configuration register. If it detects that it is not so, the status of activation of the enable signal S1 is maintained, as is the normal status of the tri-state buffer 74 and the transfer of bus signals. In this example, the bus signals are transferred with the delay of the clock buffer 76.

Figure 12:
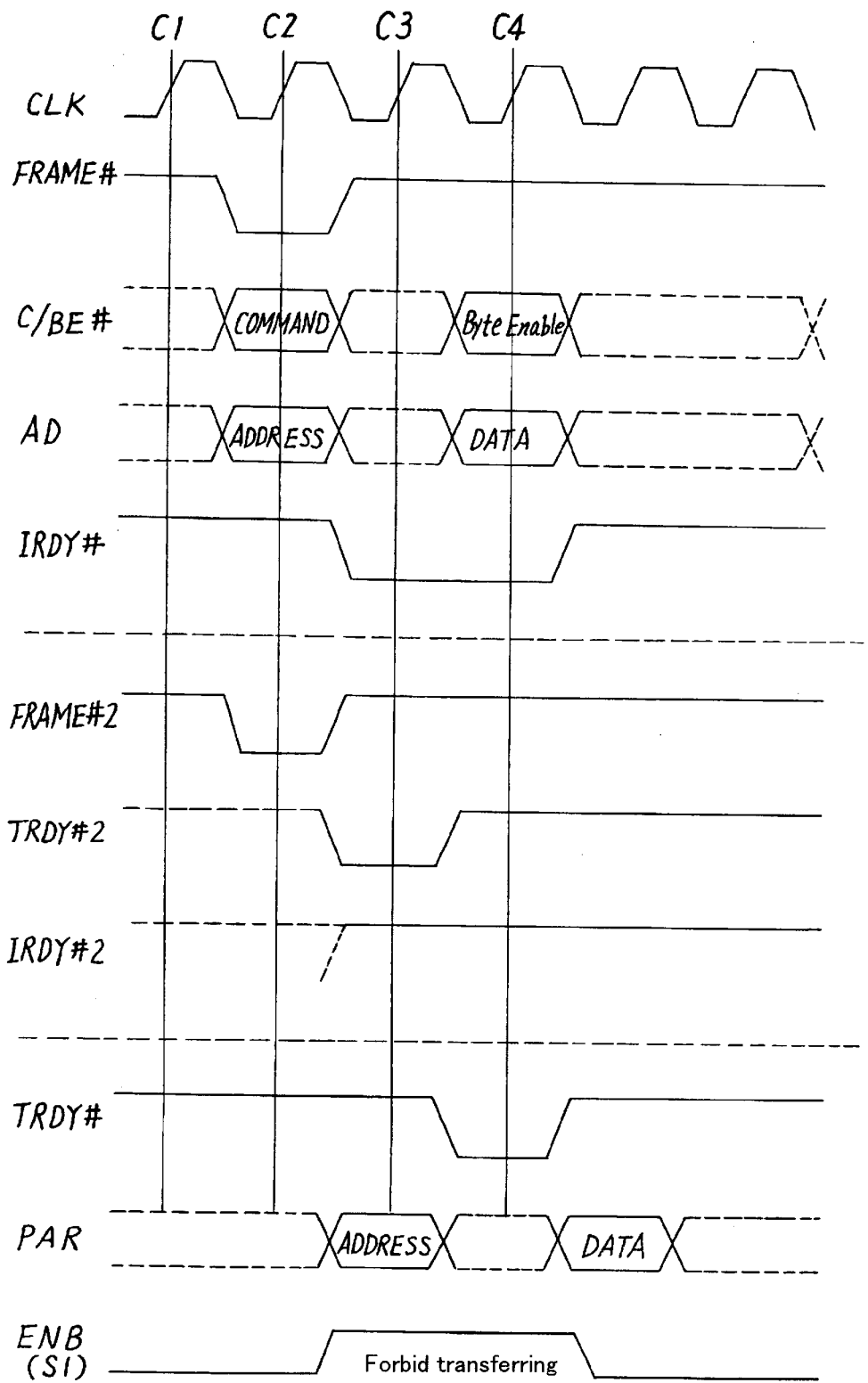
FIG. 12 is a timing chart for when a register within the configuration space characteristic of the CardBus specifications has been accessed.

FIG. 12 is a timing chart for when a register within the configuration space characteristic of the CardBus specifications has been accessed. In this case, the decoder 78 forbids the transfer of bus signals by the tri-state buffer 74. Here a '2' is suffixed to bus signals on the PCI device side in order to distinguish them from bus signals on the system side.

Firstly, the system, which is the initiator, samples cycle frame FRAME# and initiator ready IRDY# with clock C1 timing, and detects that the bus is in idle status. The system as the initiator then asserts cycle frame FRAME# (L level) with clock C1 timing, and notifies initiation of a bus cycle. In the same way, the system sends the address of the register within the configuration space which is to be read into the address data AD, and the configuration read command to command & byte enable C/BE#, both with clock C1 timing. The address is that of the internal register of the interface circuit 28.

These bus signals are received into the input buffer 70 with clock C2 timing, while cycle frame FRAME#, address & data AD address and command & byte enable C/BE# command are decoded by the decoder 78. The decoder 78 deciphers these signals and detects that the register of the internal configuration area has been accessed, and the enable signal S1 to the tri-state buffer 74 is deactivated. As a result, the transfer to the PCI device of bus signals received with clock 2 timing is halted.

The decoder 78 sends the enable signal S2 to the PCI device processing circuit 82 and terminates the PCI device bus. In other words, cycle frame FRAME#2 is deasserted (H level) with clock C3 timing, and initiator ready IRDY#2 is asserted (L level). Then, initiator ready IRDY#2 is deasserted. As a result, the PCI device bus is terminated, and the PCI device 29 does not detect any access.

Further, the decoder 78 sends enable signal S3 or S4 to the register and parity generation circuit 84 or 86 which is specified in the address. As a result, the specified circuit 84 or 86 first puts the system bus on stand-by with target ready TRDY# unchanged at H level. The circuit 84 or 86 then asserts target ready TRDY# with clock C3 timing and notifies that it is in a status wherein it is capable of transmission. At the same time, device select DEVSEL# (not shown in the drawing) is also asserted. In response to initiator ready IRDY#, which has already been asserted with clock C2 timing, the data within registers 84, 86 is sent to address data AD, and at the same time byte data on the valid data (byte enable) is sent to command & byte enable C/BE#, and target ready TRDY# is asserted. At the clock c4 timing, the registers and parity generation circuits then send to parity PAR the parity bit of the configuration register data which was transmitted back.

The system, initiator side, retrieves the data which was transmitted back from the valid bytes in address data AD, and processes it as required.

Finally, the registers and parity generation circuits 84, 86 of the interface circuit, which is the target, dessert target ready TRDY# and device select DEVSEL#. The initiator detects this and deasserts initiator ready IRDY#, and the configuration bus cycle terminates.

Thereafter, in accordance with the normal data read bus cycle, the system specifies the address which has been read from the CIS pointer register, and acquires the CIS data from the external boot ROM 40 of the PCI device 29.

As above, when a configuration register which is peculiar to a CardBus is accessed, the interface circuit 28 detects this, halts transfer of bus signals to subsequent PCI devices and itself sends back data from the designated register in the integral configuration register. At that time, the interface circuit 28 makes the system side in stand-by status, and terminates the bus cycle at the PCI device side. With any other bus cycle, the bus signals are simply transferred to the PCI device, and it is left to the PCI device to implement the required processing. Thus, by just adding a simply configured interface circuit it is possible to utilise an inexpensive general-use PCI device to provide a CardBus PC Card.

[Another Embodiment]

Figure 13:
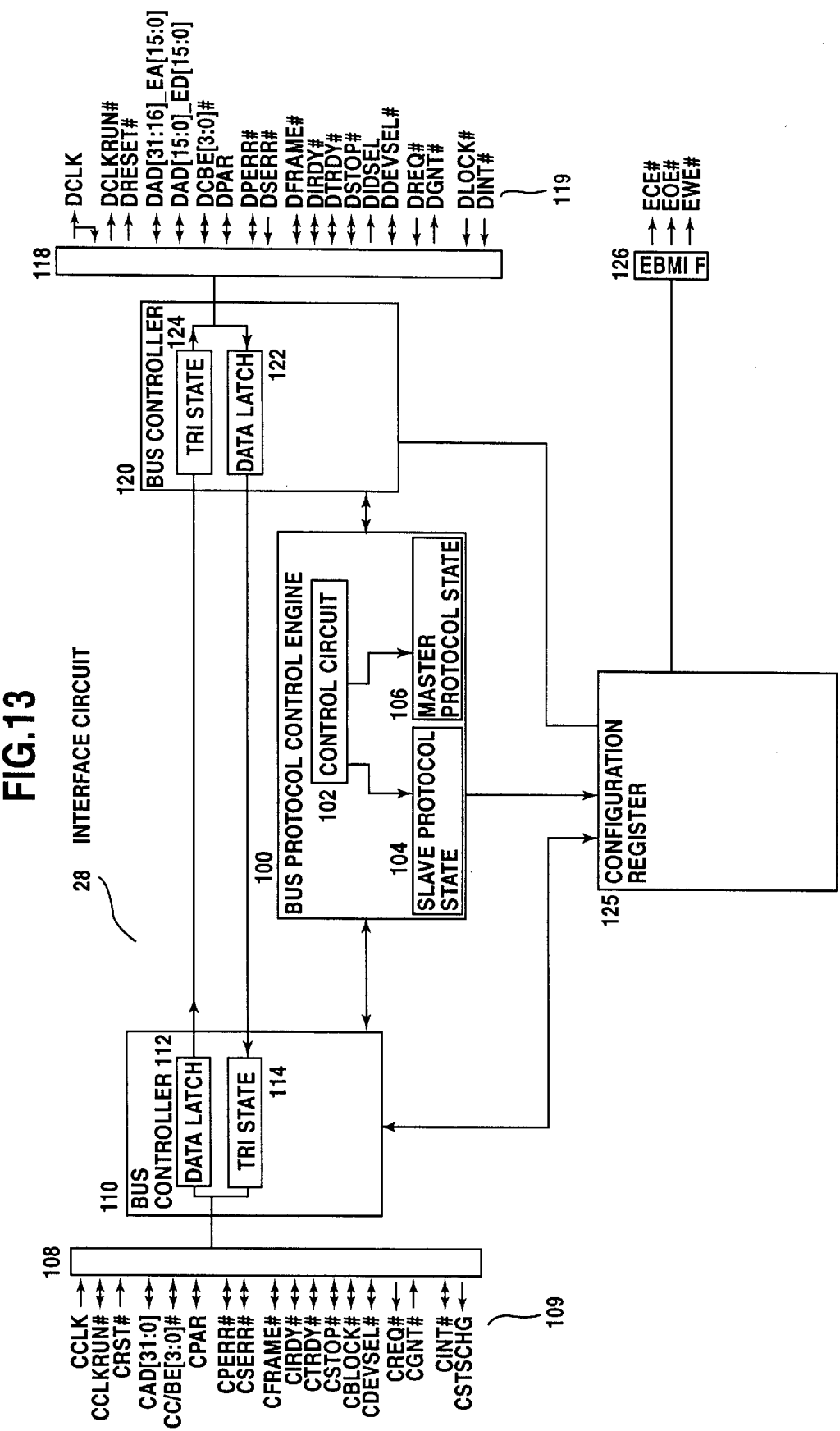
FIG. 13 illustrates an interface circuit of another embodiment.

FIG. 13 illustrates an interface circuit of another embodiment. With this interface circuit 28, a CardBus connector bus 109, which connects to the system, connects to a left-side input/output buffer 108, while a bus 119 of a device corresponding to a PCI bus connects to a right-side input/output buffer 118. To make things easier to understand, all the elements of the CardBus connector bus 109 have a capital letter C prefixed, while all those of the bus 119 of the device corresponding to a PCI bus are prefixed with a capital letter D. Bus signals apart from those which have been explained above include reset RST# (which is asserted when the power supply is turned on and at other times), parity error PERR#, system error SERR#, stop STOP# (which is asserted when a transaction is halted), block BLOCK#, device select DEVSEL# (which is asserted by an accessed target), request REQ# (which is asserted when implementing bus access), grant GNT (which is asserted when the system's arbitration function grants the right to use a bus to a master device which has asserted a request), initialisation device select IDSEL#, lock LOCK# and interrupt INT#. The symbol # indicates a negative logic signal. In other words, it is in activation status at L level.

The interface circuit 28 further has a first bus controller circuit 110, having a data latch circuit 112 which latches bus signals input from the CardBus connector and a tri-state circuit 114 which sends bus signals output to the connector, and a second bus controller circuit 120, similarly having a data latch circuit 122 which latches bus signals input from the PCI device and a tri-state circuit 124 which sends bus signals output to the PCI device. The timing for latching or sending the bus signals is controlled by means of a slave protocol circuit 104 or master protocol circuit 106 of a bus protocol engine 100. The timing of the bus control signals is adjusted as necessary.

The bus protocol engine 100 has a control circuit 102, S which according to the assert status of request REQ# and grant GNT# detects whether the PCI card is acting as master device or as slave device, and activates the corresponding master protocol circuit 106 or slave protocol circuit 104. When the master device seeks to implement bus access, it normally requests the right to use the bus by asserting request REQ#. Use of the bus is granted by the system's arbitration function asserting grant GNT#. Thus, the control circuit 102 activates the master protocol circuit 106 when it detects that the PCI device's request DREQ# and the Card-Bus's grant CGNT# have been asserted. Moreover, so long as the CardBus's grant CGNT# is in deassert status, the control circuit 102 activates the slave protocol circuit 104 in preparation for access from another master device.

The interface circuit 28 has a register group 125 within the configuration space in which are stored the abovementioned CIS pointer peculiar to CardBus specifications, sub-system ID, sub-system vendor ID and capability pointer. An input circuit 126 writes into the configuration registers 125.

The characteristic point of the present embodiment is that data latch circuits 112, 122 are provided within the interface circuit 28, the signals of the CardBus bus line 109 and the PD device bus line 119 being latched temporarily in the respective latch circuits and then being transferred to the opposite side from the respective tri-start circuits 114, 124 with a timing delay of, for instance, one clock. Since configuration registers 125 are provided within the interface circuit 28, it is necessary for the bus protocol engine 100 to decode whether or not the integrated registers 125 are being accessed. Thus, the bus protocol engine 100 forecasts the decoding time and controls transfer to the bus lines 109, 119 by delaying by one clock, or by two or more clocks.

Figure 14:
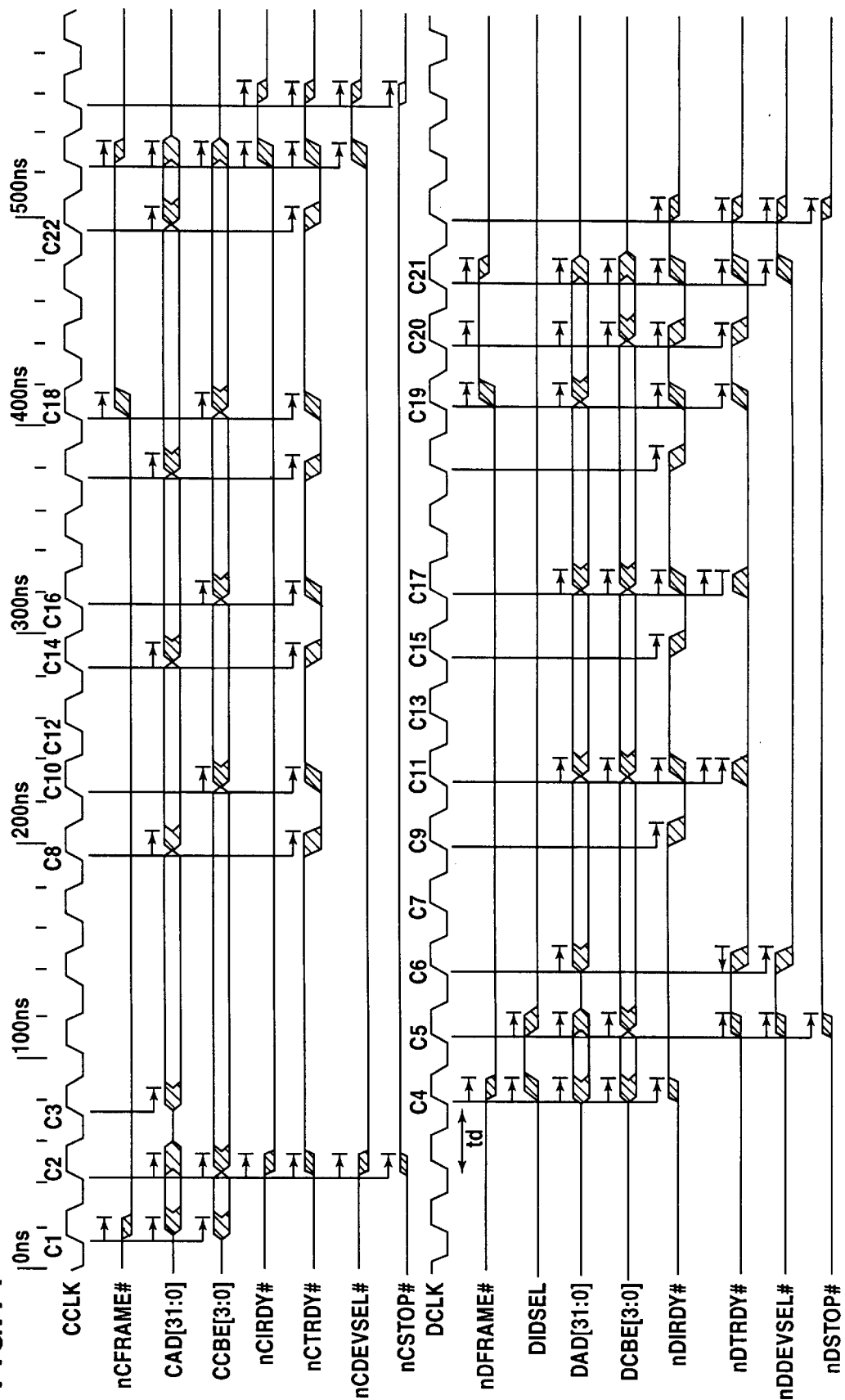
FIG. 14 is a timing chart of a burst read transfer.

FIG. 14 is a timing chart of a burst read transfer where the data phase is multiphase. This timing chart shows only those bus signals which are necessary in order to explain burst read transfer. This burst read transfer is an action whereby four pieces of data are read from a CardBus to a PCI device. The PCI device clock DCLK is generated from the CardBus clock CCLK, and is delayed only by the propagation delay time within the interface circuit and the gate transfer time. For convenience of explanation the respective timings will be referred to as c1–c22. The arrows on the chart show the prescribed time from initiation of the clock, and this is a variable time tval until data establishment as determined in the standards.

Cycle frame CFRAME# of the CardBus connector connected to the system is asserted with timing c1, and the address phase, which is the first burst transaction, is initiated. At the same time, the address which it is sought to access is sent to address data CAD, and the read command to command & byte enable CC/BE. In the interface circuit 28 the data latch circuit 112 latches these bus signals with timing c2. The latched command and address are decoded by the slave protocol circuit 104. This action of decoding is implemented during the interval td in the drawing.

When decoding permits detection of the fact that it is not an access to a register 125 within the internal configuration space, the slave protocol circuit 104 causes cycle frame DFRAME#, address data DAD and command & byte enable DC/BE to be sent from the tri-state circuit 124 with delayed clock C4 timing corresponding to clock C3, which is delayed by one clock in comparison with clock C2. The timing of this transfer is timing c4, which is delayed by one clock and the delay time within the interface circuit in comparison with timing c2. As a result, it is possible to complete the action of decoding correctly, and to forbid the transfer of bus signals to the PCI device if necessary.

The slave protocol circuit 104 switches ID select DIDSEL to H level with timing c4. In the PCI bus specifications, this ID select DIDSEL is a signal which is sent to the target device during the configuration cycle. However, as is shown in FIG. 1, in the CardBus specifications there is a one-to-one correspondence between the bridge LSI and CardBus PC Card. Normally the bridge LSI does not generate this ID select signal to a PC Card. In order to send an ID select signal to the PCI device in the same way as normal, the interface circuit 28 generates it instead. Thus, at times such as when the configuration register of the PCI device is being accessed, this ID select DIDSEL is generated by the slave protocol circuit 104.

The PCI device recognises with timing C5 that a bus cycle has been initiated from the fact that cycle frame DFRAME# is asserted. It decodes command at the command & byte enable DC/BE and address the data address DAD, and detects that it is a bus cycle reading the prescribed address data.

The PCI device asserts target ready DTRDY# with timing c6, and sends the prescribed byte address data by means of command & byte enable DC/BE back to address data DAD. With timing c7 the data latch circuit 122 of the interface circuit receives this data, and with the next clock timing c8 asserts target ready CTRDY# for the first time from the tri-state circuit 114, and transfers the data by way of address data CAD to the CardBus connector. In other words, between timing c2 and timing c8 the CardBus connector is in stand-by status (target ready CTRDY# is at H level).

A master device at the system side recognises as correct the data which was latched when target ready CTRDY# and initiator ready CIRDY# were asserted. Thereafter the remaining three pieces of data are transferred one by one in the same manner. Action peculiar to burst transfer will be explained below.

As has been stated above, transfer to the target is implemented with a delay of one clock cycle from reception of the bus line signal from the initiator by the interface circuit. This allows ample time for decoding within the interface circuit. It is the same where the first action is a burst write action, and also if the initiator and target are reversed.

In FIG. 14, if it is detected from the bus signals latched with timing C2 that it is the registers 125 within the configuration space in the interface circuit which are being accessed, the data within the registers 125 is sent back to the initiator by the slave protocol circuit 104 without transferring bus signals subsequent to timing C4 in FIG. 14 to the PCI device.

[Further Another Embodiment]

In the above embodiment the interface circuit decodes the bus signals from the initiator in the control circuit 100 after latching them. Transfer of the bus signals is delayed by at least one clock from their latching. However, it is preferable to eliminate delay in transfer as far as possible, while at the same time being necessary to allow ample time for the action of decoding the bus signals.

A further embodiment makes use of the fact that according to PCI bus standards the initiator outputs the bus signals, which are then established after a variable time tval, and the next bus signal is guaranteed 7 sec before the next clock rising. In other words, the action necessary for decoding the bus signals is initiated in the interface circuit before they are latched. The action of decoding is completed within this 7 sec, and both the bus signals and the results of the decoding action are latched. These latching actions are all implemented within the control circuit 100.

Figure 15:
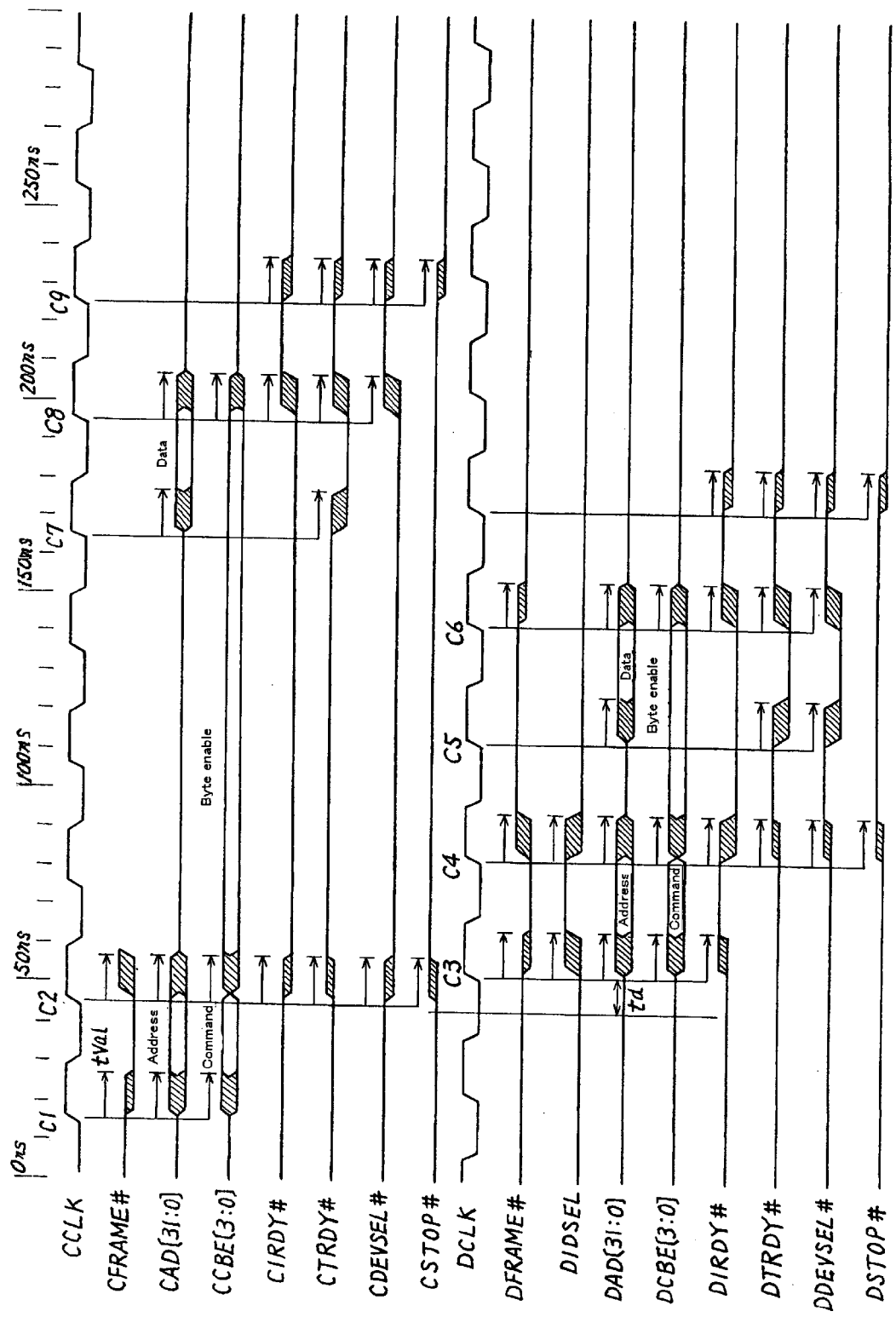
FIG. 15 is a timing chart for a single read transfer.

FIG. 15 is a timing chart for a single read transfer where the above-mentioned transfer delay is eliminated. This timing chart shows only those bus the signals which are necessary in order to explain the single read transfer. Single read transfer is an action whereby one cycle of data is read from the CardBus to the PCI device. In the same way as in FIG. 14, the PCI device clock DCLK is generated with a prescribed delay from the CardBus clock CCLK. For convenience of explanation the respective timings will be referred to as c1–c9.

Cycle frame FRAME# of the CardBus connector connected to the system is asserted with timing c1, and the address phase, which is the first burst transaction, is initiated. At the same time, the address which it is sought to access is sent to address data CAD, and the read command to command & byte enable CC/BE.

In the interface circuit 28, the data latch circuit 112 latches these bus signals with timing c2. According to PCI standards, bus signals are guaranteed from 7 nsec before timing c2 until 2 nsec after timing c2. Thus, the command and address are decoded by the slave protocol circuit 104 in advance of latching with timing c2. In other words, decoding is implemented during the interval td in the drawing, which comprises the abovementioned 7 nsec and the propagation delay time within the interface circuit. The signals containing the results of this decoding are also latched in the same manner with timing c2. Consequently, decoding of the command and address is already complete at the stage when the bus signals are latched with timing c2, thus making it possible to implement or forbid transfer of the bus signals immediately.

Decoding permits detection of the fact that it is not a register 125 within the internal configuration space which is being accessed. The slave protocol circuit 104 causes cycle frame DFRAME#, address data DAD and command & byte enable DC/BE to be sent from the tri-state circuit 124. The timing of this transfer is timing c3, which is delayed by a cycle of approximately one clock in comparison with timing c1 when the initiator initiated the bus transaction. To be more precise it is delayed by one clock cycle and the delay time within the interface circuit. As a result, it is possible to complete the action of decoding correctly, and to transfer at high speed without the need to do so at a delay of one clock from latching as in FIG. 14.

In this way, the interface circuit latches the bus signals with timing c2, the next timing after timing c1 with which the initiator initiated the address phase, which is the bus transaction, and is able to transfer the bus signals to the target PCI device with the immediately subsequent timing c3. As is shown below, the interface circuit transfers the bus signals with the next clock timing after latching them.

If decoding detects that access is to the configuration space of the PCI device, the slave protocol circuit 104 switches ID select DIDSEL to H level with timing c3. In the PCI bus specifications, this ID select DIDSEL is a signal which is sent to the target device during the configuration cycle. However, as is shown in FIG. 1, in the CardBus specifications there is a one-to-one correspondence between the bridge LSI and CardBus PC Card. Normally the bridge LSI does not generate this ID select signal to a PC Card. In order to send an ID select signal to the PCI device in the same way as normal, the interface circuit 28 generates it instead. Thus, at times such as when the configuration register of the PCI device is being accessed, this ID select DIDSEL is generated by the slave protocol circuit 104.

The PCI device recognizes with timing c4 that a bus cycle has been initiated from the fact that cycle frame DFRAME# is asserted. It decodes the command & byte enable DC/BE command and data address DAD address, and detects that it is a bus cycle reading the prescribed address data. The PCI device detects with timing c5 that initiator ready DIRDY# has been asserted (L level), as also cycle frame DFRAME# is deasserted, and that the next data phase is the last.

The PCI device asserts target ready DTRDY# with timing c5, and sends back the prescribed address data to the byte of address data DAD designated by means of command & byte enable DC/BE. With timing c6 the data, latch circuit 124 of the interface circuit receives this data, and with the next clock timing c7 asserts target ready CTRDY# for the first time from the tri-state circuit 114, and transfers the data by way of address data CAD to the CardBus connector. In other words, between timing c2 and timing c7 the CardBus connector is in stand-by status (target ready CTRDY# is at H level).

The system master device recognizes as correct the data which was latched when target ready CTRDY# and initiator ready CIRDY# were asserted. With timing c8 the master device at the system side deasserts initiator ready CIRDY#, and the interface circuit 28 deasserts target ready CTRDY#. With timing c9 the bus cycle terminates and the bus assumes idle status.

In this manner the interface circuit decodes the command and address in advance, so that it is possible to eliminate delay in bus line transfer due to idle phases. Moreover, there is no need for decoding during the data phase, and of course no delay in the bus line.

Figure 16:
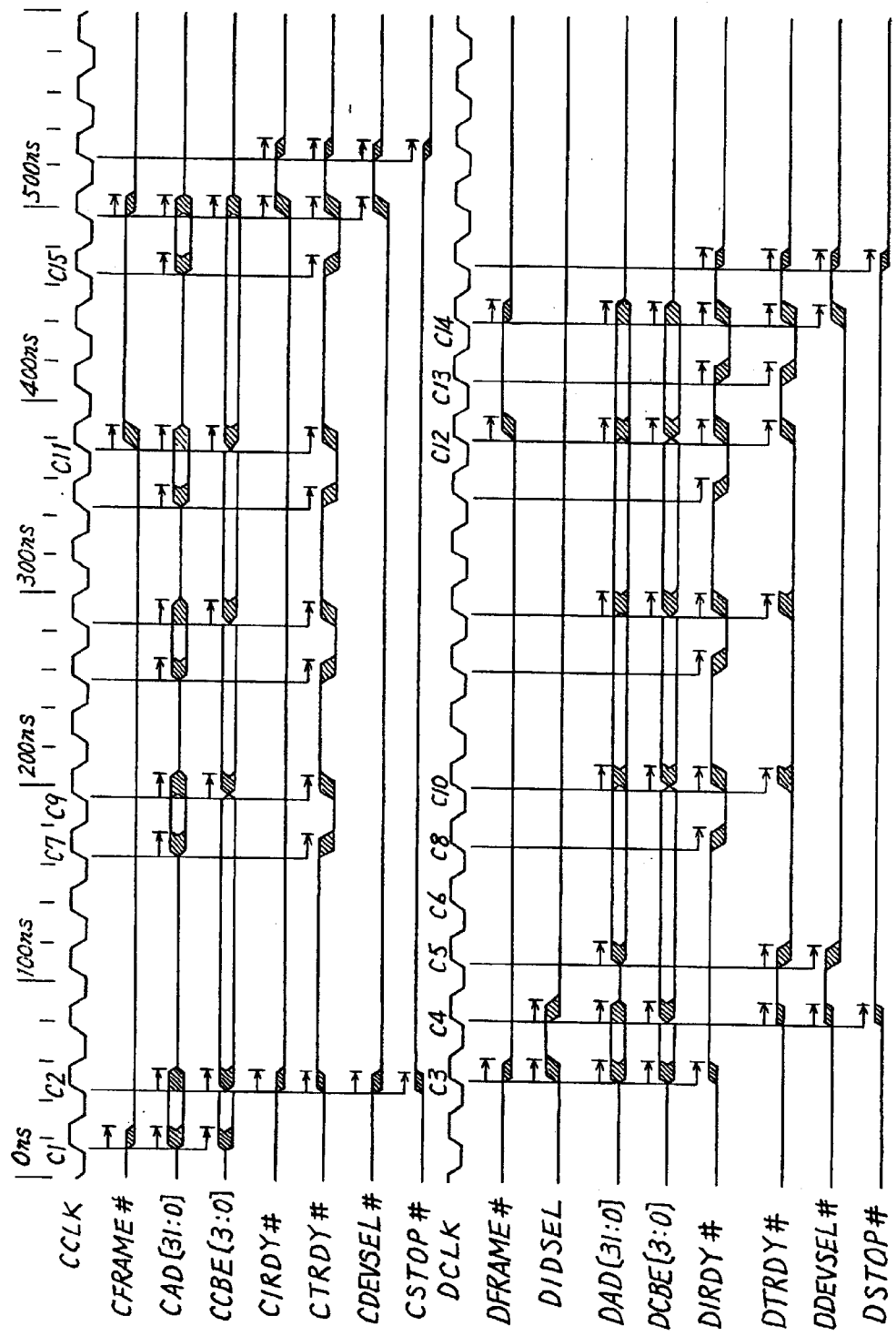
FIG. 16 is a timing chart for burst read transfer.

FIG. 16 is a timing chart for burst read transfer where a plurality of data is read and transferred. In this embodiment, as in FIG. 15, the delay in bus signal transfer in the address phase has been eliminated. All other actions are more or less the same as the burst lead actions shown in FIG. 14. Burst read is an action whereby a plurality of data is sent back continuously one after another from an address sent by the initiator in the first address cycle of the bus cycle. In PCI bus or CardBus specifications the next data phase after cycle frame FRAME# has been deasserted is the last phase. Consequently, the initiator does not deassert cycle frame in burst read until the required plurality of data has been transferred.

As in the case of single read transfer, the CardBus initiator asserts cycle frame CFRAME#. At the same time, the address is sent to address data CAD, and the read command to command & byte enable CC/BE. Prior to latching of the bus signals with timing c2 in the interface circuit 28, the slave control circuit 104 decodes them. After a delay of approximately one clock from timing c1 they are transferred from the tri-state circuit 124 to the PCI device. At that time, an ID select signal DIDSEL is generated from the slave control circuit 104 and transmitted to the PCI device.

The PCI device transmits the data corresponding to the address to address data DAD with timing c5 after one clock cycle, and asserts target ready DTRDY# (L level). The interface circuit 28 receives this data with timing c6 and latches it. With the next clock timing c7 the data is output from the tri-state circuit 114 to address data CAD, while target ready CTRDY# is asserted (L level). As a result, since target ready CTRDY# and initiator ready CIRDY# are both in assert state, the CardBus initiator latches the data on address data CAD as valid data.

What is important here is that the slave protocol circuit 104 of the interface circuit asserts initiator ready DIRDY# against the PCI device not with timing c5, but with timing c8 after the data has been transferred to the bus connector with timing c7. This allows the PCI device to transfer the next piece of data from timing c10 after receiving both assert statuses initiator ready DIRDY# and target ready DTRDY#. Since the CardBus connector initiator has already transmitted a fresh byte enable signal CCBE with timing c10, the PCI device is able to supply the next data to the correct data line prescribed by the byte enable signal.

In this manner the interface circuit transfers the data sent from the PCI device, which is the target, to the initiator during burst transfer (read and write), and then sends the assert statuses initiator ready DIRDY# and target ready DTRDY#, which show that the data phase is complete. This means that it is possible for the target to send the data of the next data phase on a valid data bus line.

As FIG. 16 shows, during burst transfer there is no need to decode the command in the second and subsequent data phases. As a result, the byte enable signal from the initiator is transferred to the PCI device without any decoding action. Moreover, even in the second data phase the slave protocol circuit does not assert initiator ready DIRDY# to the PCI device until the interface circuit transfers data to the CardBus connector. Thus, the PCI device is able to send back next data according to the freshly sent byte enable signal CCBE in the next data cycle.

As has been explained above, in burst transfer the interface circuit 28 asserts initiator ready DIRDY# with timing c8 in order to ensure that the PCI device is notified of the completion of the data phase after the data supplied by the PCI device has been transferred correctly to the card connector initiator. In other words, the interface circuit differentiates PCI device initiator ready DIRDY# from CardBus initiator ready CIRDY#.

Figure 17:
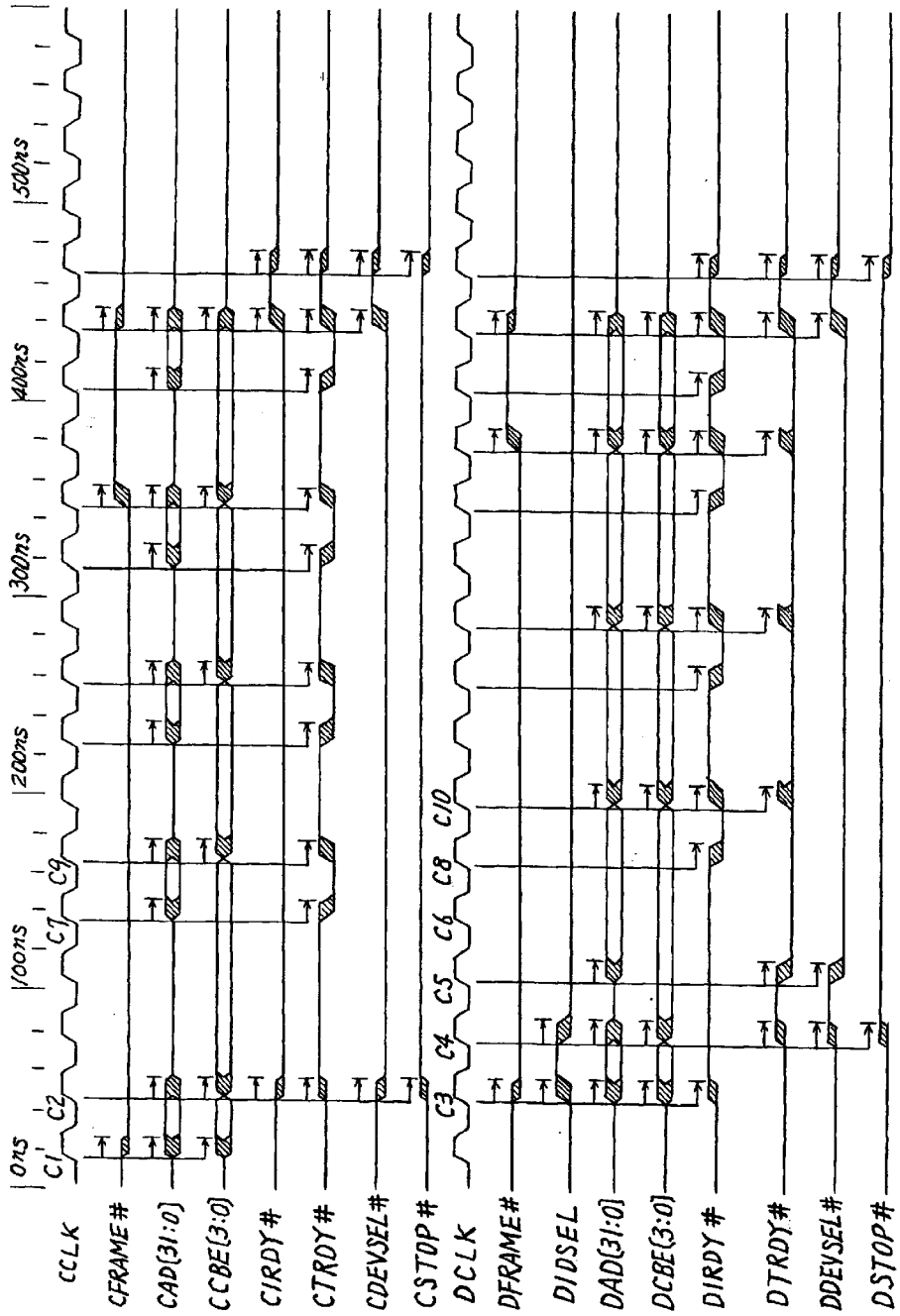
FIG. 17 is a timing chart for burst read transfer using phase-synchronised clocks.

FIG. 17 is a timing chart for burst read transfer using phase-synchronised clocks. In other words, phase-synchronised clocks CCLK, DCLK are generated on the basis of the clock CLK sent from the CardBus connector. The clock CCLK is used to control the CardBus connector within the interface circuit, while the clock DCLK is used to control the PC device. Burst read transfer is implemented in the same way as in FIG. 16, the action being more or less the same as that shown in FIG. 16.

Figure 18:
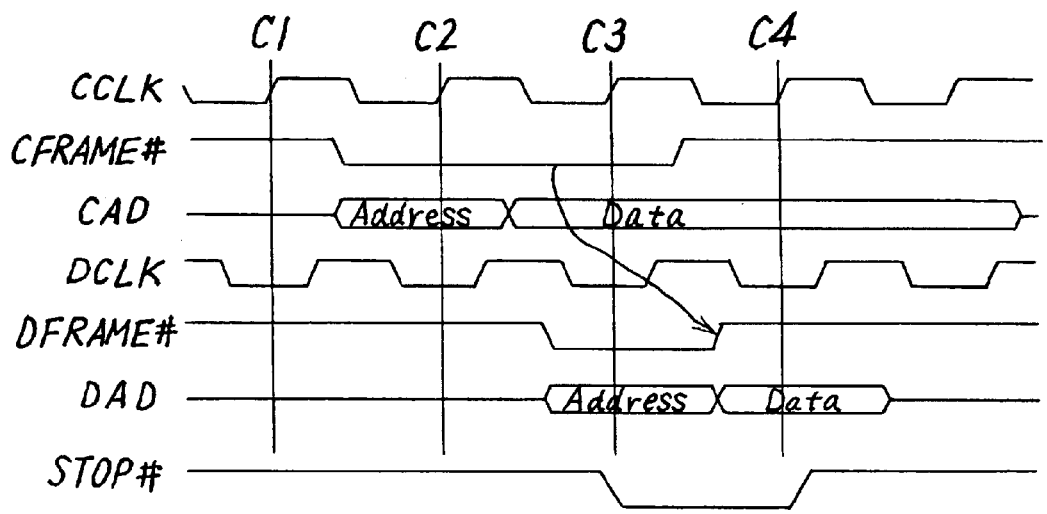
FIG. 18 is another timing chart for burst transfer in the configuration cycle of the present embodiment.

FIG. 18 is another timing chart for burst transfer in the configuration cycle of the present embodiment. In this example, a configuration space to CardBus specifications is configured from the configuration space within the interface circuit and that within the PCI device. Thus, it is necessary to avoid burst transfers over both configuration spaces.

When the interface circuit decodes the command and detects access to the configuration space, it monitors the subsequent cycle frame CFRAME#. If cycle frame CFRAME# continues to be asserted after timing c2 two clocks later, it forbids assertion of cycle frame DFRAME# to the PCI device. As a result, it is possible to avoid burst transfer actions over both configuration spaces. On the other hand, the interface circuit rejects burst transfer by asserting the stop signal STOP# against the card connector host. In this way it is possible to avoid burst transfer actions within the wrong configuration space.

The interface circuit illustrated in FIG. 13 is shown in the form of an outline drawing, but a circuit which acts as shown in the timing chart can easily be designed by a person skilled in the field with ASIC design.

As has been explained above, the present invention makes it possible to configure a CardBus PC Card corresponding to a CardBus with the aid of a device corresponding to a PCI bus and an interface circuit. Thus, by employing a general-use PCI device it is possible to provide a variety of CardBus PC Cards inexpensively.

In the present invention the interface circuit integrates a configuration space peculiar to a CardBus, thereby the configuration space complying with the CardBus is configured together by the configuration space within the device corresponding to a PCI bus. The result is that this simple configuration can easily be made to comply with a CardBus.

Moreover, in the present invention the interface circuit transfers data on the bus line at a delay of at least one clock after latching it. As a result, it is possible to determine accurately in relation to the address supplied whether or not the internal configuration space is being accessed, thus making it possible to halt transfer where access is to an integrated register.

Furthermore, in the present invention the interface circuit decodes the address and command in advance after the initiator initiates the address phase and before being latched with the next clock timing. As a result, transfer becomes possible on latching, thus eliminating transfer delay in the address phase.

What is claimed is:

1. A CardBus PC Card complying with a CardBus and having a CardBus connector, comprising:
   a device complying with a PCI bus, having a predetermined function and having a first configuration space which complies with the PCI bus; and
   an interface circuit located between said device complying with the PCI bus and said CardBus connector, and having a second configuration space which complies with said CardBus,
   wherein said first and second configuration spaces constitute a configuration space which complies with a CardBus.

2. The CardBus PC Card according to claim 1, wherein said interface circuit monitors the state of said CardBus which is connected to the CardBus connector, and when said second configuration space is accessed, halts a transfer of signals at said CardBus to said device complying with the PCI bus, and sends back data from said second configuration space, while on the other hand transferring signals at said CardBus to said device complying with the PCI bus when anywhere other than said second configuration space is accessed.

3. The CardBus PC Card according to claim 1 or claim 2, wherein said interface circuit has a delayed clock generating circuit which generates a delayed clock signal by delaying for a specified time the clock signal which is fed from said CardBus connector, and feeds this delayed clock signal to said device complying with the PCI.

4. The CardBus PC Card according to claim 2, wherein when said second configuration space is accessed, said interface circuit causes said CardBus which is connected to the CardBus connector to enter stand-by mode, completes the cycle of the bus which is connected to said device complying with the PCI bus, and sends back data from said second configuration space.

5. The CardBus PC Card according to claim 1, further comprising a booster circuit which serves to boost a first power supply fed to said CardBus connector, to a second power supply, and supplies the second power supply to said device complying with the PCI bus.

6. The CardBus PC Card according claim 1, further comprising an external ROM which stores data to be fed into said second configuration space, said interface circuit storing data from said external ROM in said second configuration space when said CardBus connector is connected to the CardBus.

7. An interface circuit inserted between a device complying with a PCI bus, having a predetermined function and having a first configuration space which complies with the PCI bus, and a CardBus connector, comprising:

a second configuration space which is a part of a configuration space complying with said CardBus, and is configured as the configuration space complying with said CardBus together with said first configuration space.

8. A CardBus PC Card complying with a CardBus and having a CardBus connector, comprising:

a device complying with a PCI bus, having a predetermined function and having a first configuration space which complies with the PCI bus; and an interface circuit located between said device complying with the PCI bus and said CardBus connector, and having a second configuration space which complies with said CardBus, said first and second configuration spaces constituting a configuration space which complies with said CardBus, said interface circuit having a control circuit which monitors the state of said CardBus and when detecting that somewhere other than said second configuration space has been accessed in accordance with a signal from said CardBus received with a first clock timing, transfers the signal from said CardBus to said device complying with the PCI bus with a second clock timing having a delay of at least one clock in comparison with said first clock timing, while on the other hand when detecting that said second configuration space has been accessed, instead of transferring the signal from said CardBus to said device complying with the PCI bus, outputs data from said second configuration space to said CardBus.

9. A CardBus PC Card complying with a CardBus and having a CardBus connector, comprising:

a device complying with a PCI bus, having a predetermined function and having a first configuration space which complies with a PCI bus; and an interface circuit located between said device complying with the PCI bus and said CardBus connector, and having a second configuration space which complies with said CardBus, said first and second configuration spaces constituting a configuration space which complies with said CardBus, said interface circuit having a control circuit which monitors the state of said CardBus and when detecting that somewhere other than said second configuration space has been accessed in accordance with a signal from said CardBus transmitted with a first clock timing, transfers the signal from said CardBus to said device complying with the PCI bus with a second clock timing having a delay of at least one clock in comparison with said first clock timing, while on the other hand when detecting that said second configuration space has been accessed, instead of transferring the signal from said CardBus to said device complying with the PCI bus, outputs data from said second configuration space to said CardBus.

10. The CardBus PC Card according to claim 8 or claim 9, wherein in a burst read cycle, after transferring to said CardBus the data sent back by said device complying with the PCI bus, said control circuit transmits to said device complying with the PCI bus a control signal signifying that the relevant data cycle has terminated.

11. The CardBus PC Card according to claim 8 or claim 9, wherein when a burst transfer to said configuration space is detected, said control circuit prevents the assertion of a burst control signal to said device complying with the PCI bus.

12. The CardBus PC Card according to claim 8 or claim 9, wherein when decoding an address fed to said CardBus connector detects that it is a configuration cycle for said device complying with the PCI bus, said control circuit feeds a selection signal to said device complying with the PCI bus.

13. An interface circuit inserted between a device complying with a PCI bus, having a predetermined function and having a first configuration space which complies with the PCI bus, and a CardBus connector, comprising:

a second configuration space which complies with a CardBus, said first and second configuration spaces configuring a configuration space which complies with the CardBus; and a control circuit which monitors the state of said CardBus connected to the CardBus connector, and when detecting that somewhere other than said second configuration space has been accessed in accordance with a signal from said CardBus received with a first clock timing, transfers the signal from said CardBus to said device complying with the PCI bus with a second clock timing having a delay of at least one clock in comparison with said first clock timing, while on the other hand when detecting that said second configuration space has been accessed, instead of transferring the signal from said CardBus to said device complying with the PCI bus, outputs data from said second configuration space to said CardBus.

14. An interface circuit inserted between a device complying with a PCI bus, having a predetermined function and having a first configuration space which complies with the a PCI bus, and a CardBus connector, comprising:

a second configuration space which complies with a CardBus, said first and second configuration spaces constituting a configuration space which complies with the CardBus; and a control circuit which monitors the state of said CardBus which is connectable to the CardBus connector, and when detecting that somewhere other than said second configuration space has been accessed in accordance with a signal from said CardBus transmitted with a first clock timing, transfers the signal from said CardBus to said device complying with the PCI bus with a second clock timing having a delay of at least one clock in comparison with said first clock timing, while on the other hand when detecting that said second configuration space has been accessed, instead of transferring the signal from said CardBus to said device complying with the PCI bus, outputs data from said second configuration space to said CardBus.

* * * * *